United States Patent
Otto et al.

(10) Patent No.: US 12,264,009 B2
(45) Date of Patent: *Apr. 1, 2025

(54) SYSTEM COMPRISING A MULTILEVEL WAREHOUSE RACKING SYSTEM COMPRISING TOTE TRANSFER ZONES, MATERIALS HANDLING VEHICLES, AND TRANSPORTERS, AND METHODS OF USE THEREOF

(71) Applicant: Crown Equipment Corporation, New Bremen, OH (US)

(72) Inventors: Matthew J. Otto, New Bremen, OH (US); Gregory S. Garmann, Us, OH (US); Mark E. Addison, Ludlow Falls, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,420

(22) Filed: Oct. 24, 2023

(65) Prior Publication Data

US 2024/0051743 A1 Feb. 15, 2024

Related U.S. Application Data

(63) Continuation of application No. 17/899,839, filed on Aug. 31, 2022, now Pat. No. 11,834,264, which is a
(Continued)

(51) Int. Cl.
*B65G 1/137* (2006.01)
*B65G 1/02* (2006.01)

(52) U.S. Cl.
CPC ............. *B65G 1/026* (2013.01); *B65G 1/137* (2013.01)

(58) Field of Classification Search
CPC ................. B65G 1/026; B65G 1/137
See application file for complete search history.

(56) References Cited

U.S. PATENT DOCUMENTS

| | | | |
|---|---|---|---|
| 4,698,775 A | 10/1987 | Koch et al. | |
| 5,032,994 A | 7/1991 | Wellman | |

(Continued)

FOREIGN PATENT DOCUMENTS

| | | |
|---|---|---|
| AU | 2018282332 A1 | 1/2019 |
| AU | 2020203109 A1 | 5/2020 |

(Continued)

OTHER PUBLICATIONS

European Patent Office Action dated Aug. 16, 2024 issued in EP Application No. 21 7113 236.4.

(Continued)

*Primary Examiner* — Kyle O Logan
(74) *Attorney, Agent, or Firm* — Dinsmore & Shohl LLP

(57) ABSTRACT

Goods storage and retrieval systems and materials handling vehicles are provided. The goods storage and retrieval system includes a multilevel warehouse racking system; a materials handling vehicle comprising a mast assembly, a picking attachment, and vehicle-based cart engagement hardware; a mobile storage cart; and a transporter comprising transporter-based engagement hardware. The transporter-based engagement hardware enables the transporter to engage, transport, and disengage the mobile storage cart. The vehicle-based cart engagement hardware is coupled to the mast assembly to (i) engage and disengage the mobile storage cart and (ii) transport the mobile storage cart to multiple levels of the multilevel warehouse racking system. The mast assembly and the picking attachment are configured to access multiple levels of the multilevel warehouse racking system. The picking attachment is configured to
(Continued)

transfer totes between the multilevel warehouse racking system and the mobile storage cart.

18 Claims, 22 Drawing Sheets

Related U.S. Application Data continuation of application No. 16/800,623, filed on Feb. 25, 2020, now Pat. No. 11,465,839.

(56) References Cited

U.S. PATENT DOCUMENTS

| | | | |
|---|---|---|---|
| 6,748,292 B2 | 6/2004 | Mountz | |
| 6,950,722 B2 | 9/2005 | Moutz | |
| 7,591,630 B2 | 9/2009 | Lert, Jr. | |
| 7,765,780 B2 | 8/2010 | Koselka et al. | |
| 7,894,933 B2 | 2/2011 | Mountz et al. | |
| 7,991,505 B2 | 8/2011 | Lert, Jr. et al. | |
| 8,403,614 B2 | 3/2013 | Bastian, II et al. | |
| 8,784,034 B2 | 7/2014 | Lert, Jr. | |
| 8,805,573 B2 | 8/2014 | Brunner et al. | |
| 8,812,147 B2 | 8/2014 | Keller et al. | |
| 8,851,827 B2 | 10/2014 | Burgstaller et al. | |
| 8,882,432 B2 | 11/2014 | Bastian, II et al. | |
| 8,892,241 B2 | 11/2014 | Weiss | |
| 8,965,560 B2 | 2/2015 | Mathi et al. | |
| 8,972,045 B1 * | 3/2015 | Mountz | G06Q 10/087 700/229 |
| 8,977,398 B2 | 3/2015 | Jacobsen et al. | |
| 9,002,506 B1 | 4/2015 | Agarwal et al. | |
| 9,315,345 B2 | 4/2016 | Girtman et al. | |
| 9,317,034 B2 | 4/2016 | Hoffman et al. | |
| 9,365,348 B1 | 6/2016 | Agarwal et al. | |
| 9,540,171 B2 | 1/2017 | Elazary et al. | |
| 9,592,759 B1 | 3/2017 | Theobald | |
| 9,725,241 B2 | 8/2017 | Swinkels et al. | |
| 11,465,839 B2 | 10/2022 | Otto | |
| 11,834,264 B2 | 12/2023 | Otto | |
| 2008/0267759 A1 | 10/2008 | Morency et al. | |
| 2012/0029687 A1 | 2/2012 | Hagen et al. | |
| 2013/0103552 A1 | 4/2013 | Hoffman et al. | |
| 2014/0350725 A1 | 11/2014 | LaFary et al. | |
| 2015/0032252 A1 | 1/2015 | Galluzzo et al. | |
| 2015/0063973 A1 | 3/2015 | Girtman et al. | |
| 2015/0073589 A1 | 3/2015 | Khodl et al. | |
| 2015/0110586 A1 | 4/2015 | Hudgens et al. | |
| 2015/0332213 A1 | 11/2015 | Galluzzo et al. | |
| 2015/0360865 A1 | 12/2015 | Massey | |
| 2016/0060037 A1 | 3/2016 | Razumov | |
| 2016/0101940 A1 | 4/2016 | Grinnell et al. | |
| 2016/0107838 A1 | 4/2016 | Swinkels et al. | |
| 2016/0129592 A1 | 5/2016 | Saboo et al. | |
| 2017/0107055 A1 | 4/2017 | Magens et al. | |
| 2017/0203920 A1 | 7/2017 | Otto et al. | |
| 2017/0334644 A1 * | 11/2017 | Otto | B66F 9/12 |
| 2017/0334645 A1 | 11/2017 | Otto et al. | |
| 2018/0265297 A1 | 9/2018 | Nakano et al. | |
| 2019/0016573 A1 | 1/2019 | D'Andrea | |
| 2019/0092569 A1 | 3/2019 | Otto et al. | |
| 2019/0332096 A1 | 10/2019 | Porter et al. | |

FOREIGN PATENT DOCUMENTS

| | | |
|---|---|---|
| CN | 206075134 U | 4/2017 |
| EP | 2987761 A1 | 7/2015 |
| WO | 2019212758 A1 | 11/2019 |

OTHER PUBLICATIONS

Office Action issued Mar. 15, 2024 in related Chinese Application No. 202180027912.6 filed Feb. 25, 2021.

* cited by examiner

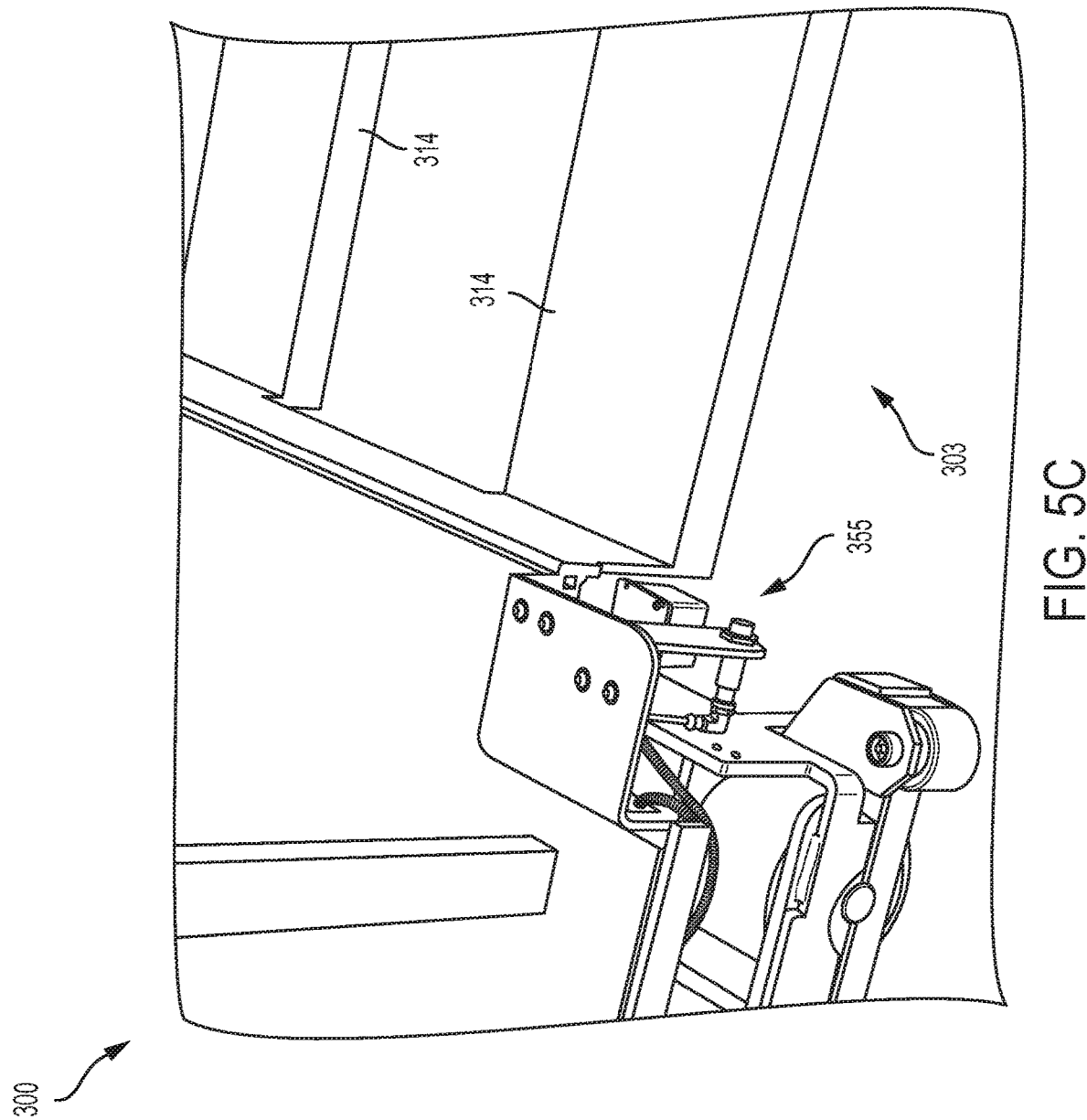

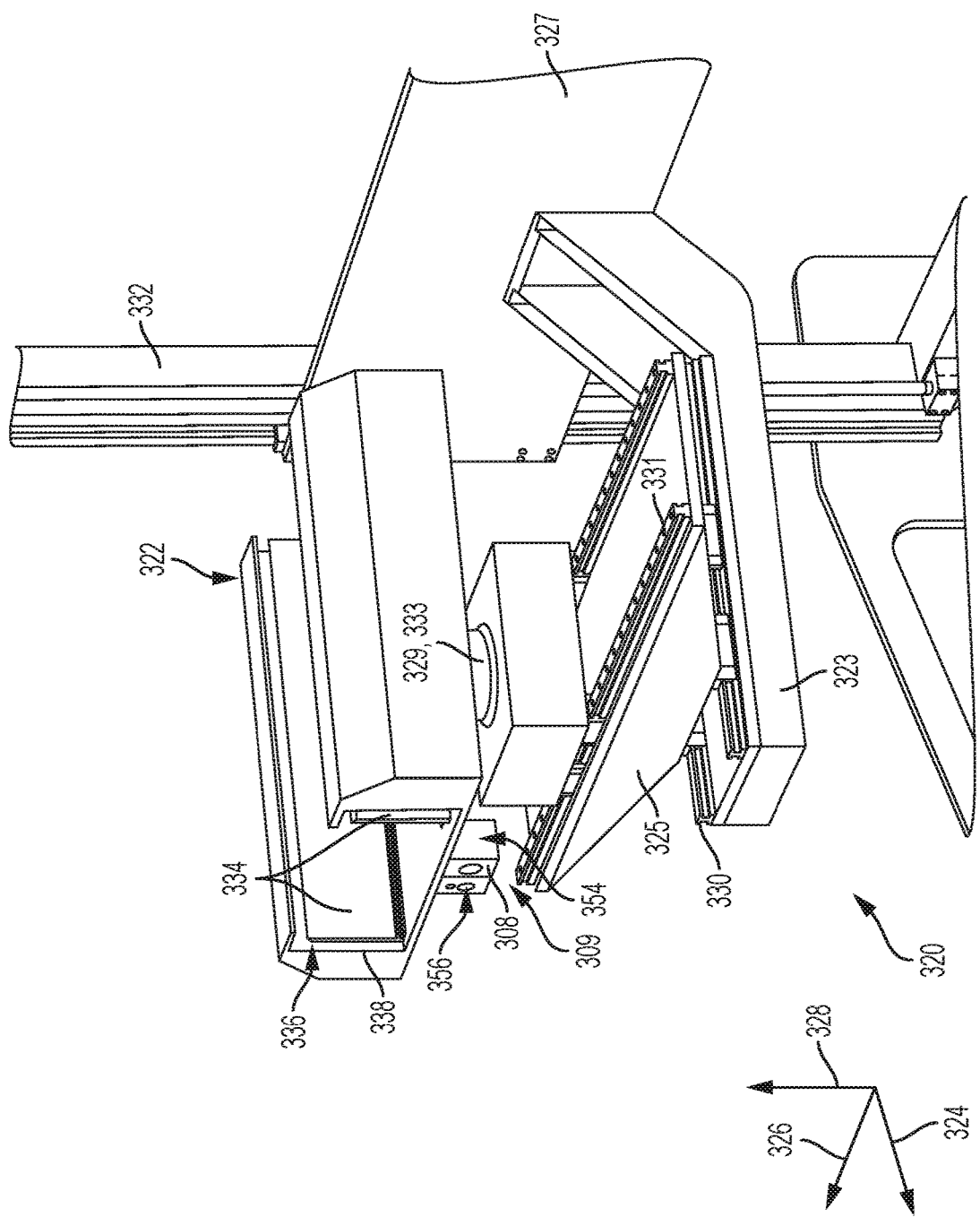

SYSTEM COMPRISING A MULTILEVEL WAREHOUSE RACKING SYSTEM COMPRISING TOTE TRANSFER ZONES, MATERIALS HANDLING VEHICLES, AND TRANSPORTERS, AND METHODS OF USE THEREOF

CROSS-REFERENCE TO RELATED APPLICATIONS

This application is a continuation application of U.S. patent application Ser. No. 17/899,839, filed Aug. 31, 2022, which is a continuation of U.S. Pat. No. 11,465,839, issued Oct. 11, 2022, both entitled "System Comprising A Multilevel Warehouse Racking System Comprising Tote Transfer Zones, Materials Handling Vehicles, And Transporters, And Methods Of Use Thereof," which are hereby incorporated by reference in their entirety including the drawings.

BACKGROUND

The present disclosure relates to a goods storage and retrieval system in a warehouse environment. The system functionally integrates a multilevel warehouse racking system, one or more materials handling vehicles, one or more mobile storage carts, and one or more transporters. For the purposes of defining and describing the concepts and scope of the present disclosure, it is noted that a "warehouse" encompasses any indoor or outdoor industrial facility in which materials handling vehicles transport goods including, but not limited to, indoor or outdoor industrial facilities that are intended primarily for the storage of goods, such as those where multi-level racks are arranged in aisles, and manufacturing facilities where goods are transported about the facility by materials handling vehicles for use in one or more manufacturing processes.

BRIEF SUMMARY

According to the subject matter of the present disclosure, goods-to-man warehousing systems are provided to increase the adaptability, utility, and efficiency of partially and fully autonomous materials handling vehicles and transporters in the warehouse environment.

In accordance with one embodiment of the present disclosure, a goods storage and retrieval system is provided. The goods storage and retrieval system comprises a multilevel warehouse racking system comprising a tote transfer zone, a materials handling vehicle comprising a mast assembly and a picking attachment, a target tote, and a transporter comprising transporter-based engagement hardware. The transporter-based engagement hardware enables the transporter to engage, transport, and disengage the target tote at the tote transfer zone independent of movement of the materials handling vehicle within the goods storage and retrieval system. The picking attachment is coupled to the mast assembly for movement along a lifting dimension of the mast assembly to (i) engage and disengage the target tote at the tote transfer zone and at multiple levels of the multilevel warehouse racking system independent of movement of the transporter within the goods storage and retrieval system and (ii) transport the target tote to multiple levels of the multilevel warehouse racking system independent of movement of the transporter within the goods storage and retrieval system. The mast assembly and the picking attachment are configured to access multiple levels of the multilevel warehouse racking system.

In accordance with another embodiment of the present disclosure, a method of operating a goods storage and retrieval system is provided. The method comprises providing the goods storage and retrieval system comprising a multilevel warehouse racking system, a materials handling vehicle disposed on an inventory transit surface, a tote transfer zone, a target tote, and a transporter comprising transporter-based engagement hardware. The materials handling vehicle comprises a traction control unit, a braking system, and a steering assembly, each operatively coupled to one or more of the vehicle wheels. The materials handling vehicle further comprises a mast assembly, a fork carriage assembly movably coupled to the mast assembly, a mast assembly control unit, a carriage control unit, a picking attachment comprising an X-Y-Z-'P positioner secured to the fork carriage assembly, a navigation subsystem, and one or more vehicular controllers in communication with the traction control unit, the braking system, the steering assembly, the mast assembly control unit, the carriage control unit, the picking attachment, and the navigation subsystem. The method comprises navigating the materials handling vehicle along the inventory transit surface to the target tote through use of the navigation subsystem and the one or more vehicular controllers independent of movement of the transporter within the goods storage and retrieval system. The method comprises engaging or disengaging the target tote with the picking attachment secured to the fork carriage assembly through use of the X-Y-Z-'P positioner at the tote transfer zone and at multiple levels of the multilevel warehouse racking system independent of movement of the transporter within the goods storage and retrieval system. The method further comprises placing with the picking attachment the target tote on the tote transfer zone or on a level of the multilevel warehouse racking system and engaging the target tote with the transporter through use of the transporter-based engagement hardware comprising a transporter lifting surface.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 5C illustrates a materials handling vehicle having cart engagement sensors according to various embodiments shown and described herein;

FIG. 6 illustrates the picking attachment of FIG. 5 according to various embodiments shown and described herein;

DETAILED DESCRIPTION

Figure 5:
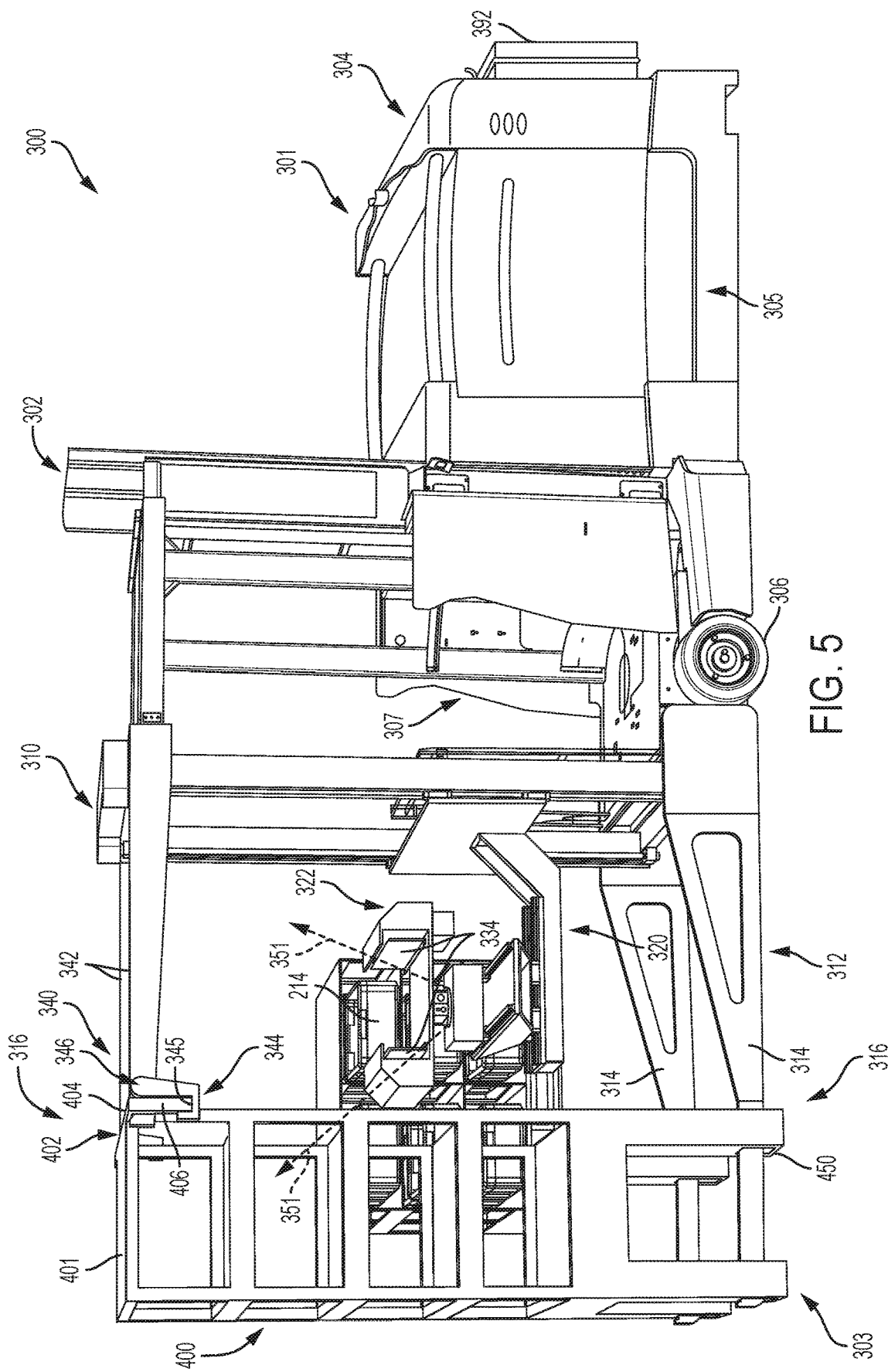
FIG. 5 illustrates a materials handling vehicle including, inter alia, a drive unit case housing a removable hand-held drive unit, a mobile storage cart with an anti-rock cart engagement mechanism and mobile storage cart support platform, and a picking attachment in position to engage a target tote according to various embodiments shown and described herein.

Referring initially to FIG. 1I, a goods storage and retrieval system 100 comprises a multilevel warehouse racking system 200, a materials handling vehicle 300, a mobile storage cart 400, and a transporter 500, disposed on an inventory transit surface 110. The materials handling vehicle 300 comprises vehicle-based cart engagement hardware 316 (FIG. 5), a mast assembly 302, and a picking attachment 320 (FIG. 5). The multilevel warehouse racking system 200 comprises a tote transfer zone 219. As shown in FIGS. 1C and 1D, the transporter 500 comprises transporter-based engagement hardware 540 that enables the transporter 500 to engage, transport, and disengage the mobile storage cart 400 by raising a lifting surface 520 of the transporter 500 to contact the mobile storage cart 400. Referring back to FIG. 1I, the transporter 500 may engage, transport, and disengage the mobile storage cart 400 at a variety of locations along an inventory transit surface 110 of the goods storage and retrieval system 100 independent of movement of the materials handling vehicle 300 within the goods storage and retrieval system 100. Referring to FIGS. 1I, 1E, and 1F, the transporter-based engagement hardware 540 further enables the transporter 500 to engage, transport, and disengage a target tote 214 at the tote transfer zone 219 by raising a lifting surface 520 of the transporter 500 to contact the target tote 214 independent of movement of the materials handling vehicle 300 within the goods storage and retrieval system 100.

Referring to FIGS. 1I and 5, the vehicle-based cart engagement hardware 316 is coupled to the mast assembly 302 for movement along a lifting dimension (along the Z'-axis as shown in FIG. 1I) of the mast assembly 302 to (i) engage and disengage the mobile storage cart 400 at a variety of locations along the inventory transit surface 110 independent of movement of the transporter 500 within the goods storage and retrieval system 100 and (ii) transport the mobile storage cart 400 to multiple levels of the multilevel warehouse racking system 200 independent of movement of the transporter 500 within the goods storage and retrieval system 100. The picking attachment 320 is coupled to the mast assembly 302 for movement along a lifting dimension of the mast assembly 302 to (i) engage and disengage the target tote at the tote transfer zone 219, the mobile storage cart 400, and at multiple, vertically spaced, levels of the multilevel warehouse racking system 200 independent of movement of the transporter 500 within the goods storage and retrieval system 100 and (ii) transport the target tote to the tote transfer zone 219, the mobile storage cart 400, and to multiple levels of the multilevel warehouse racking system 200 independent of movement of the transporter 500 within the goods storage and retrieval system 100.

The mast assembly 302 and the picking attachment 320 are configured to access multiple levels of the multilevel warehouse racking system 200. The picking attachment 320 of the materials handling vehicle 300 is configured to transfer totes between the multilevel warehouse racking system 200 and the mobile storage cart 400 at multiple levels of the multilevel warehouse racking system 200 when the mobile storage cart 400 is engaged by the materials handling vehicle 300. Additionally or alternatively, the picking attachment 320 of the materials handling vehicle 300 may be configured to transfer totes between multiple levels of the multilevel warehouse racking system 200 and the transporter 500. Additionally or alternatively, the picking attachment 320 of the materials handling vehicle 300 may be configured to transfer totes between the transporter 500 and the mobile storage cart 400 when the mobile storage cart 400 is engaged by the materials handling vehicle 300. As described in more detail below, the goods storage and retrieval system 100 may further comprise a cart home position 410, one or more mobile storage cart transfer nodes 420, one or more goods receiving stations 610, and one or more warehouse management computing hubs.

Referring still to FIGS. 1I and 5, the materials handling vehicle 300 may further comprise a vehicle body 301, a plurality of wheels 306 supporting the vehicle body 301, a traction control unit 372, a braking system 371, and a steering assembly 373, each operatively coupled to one or more of the vehicle wheels 306. The materials handling vehicle 300 may further comprise a mast assembly 302, a fork carriage assembly 310 movably coupled to the mast assembly 302, a mast assembly control unit 374, a carriage control unit 375, the picking attachment 320 secured to the fork carriage assembly 310, a cart engagement subsystem 350, and a navigation subsystem 360.

Figure 12:
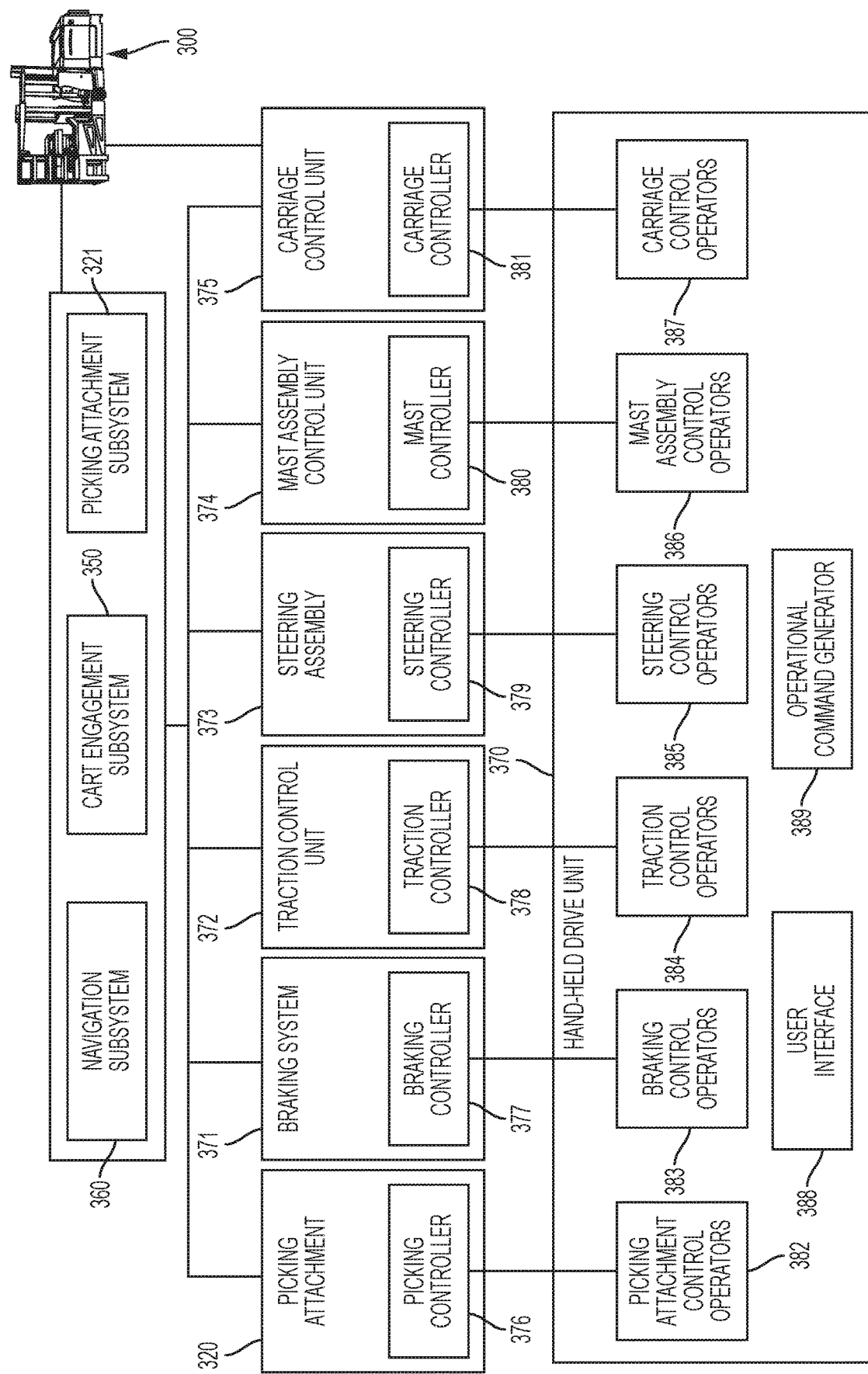
FIG. 12 is a schematic illustration of various vehicular controllers of the materials handling vehicle in communication with a hand-held drive unit and vehicle subsystems according to various embodiments shown and described herein.

Referring to FIGS. 5 and 12, the materials handling vehicle 300 may comprise one or more vehicular controllers in communication with the traction control unit 372, the braking system 371, the steering assembly 373, the mast assembly control unit 374, the carriage control unit 375, the picking attachment 320, the cart engagement subsystem 350, and the navigation subsystem 360. The vehicular controller(s) may comprise a picking controller 376, a braking controller 377, a traction controller 378, a steering controller 379, a mast controller 380, or one or more integrated controllers, to control operational functions of the picking attachment 320, the braking system 371, traction control unit 372, the steering assembly 373, or the mast assembly control unit 374. The vehicular controller(s) will be described in further detail later in the application.

While the mast assembly 302 is depicted in FIG. 1I as extending to the height of the racks 210, it is understood and within the scope of this disclosure that the mast assembly 302 may extend to different heights with respect to the racks 210. For example, the mast assembly 302 may be a multi-stage mast, with or without a free-lift feature. The aforementioned materials handling vehicles may include lift trucks available from Crown Equipment Corporation such as, for example, SP Series Order Pickers such as the Crown SP 3500/4500 Series Order Picker or TSP Series Order Pickers such as the Crown TSP 6500/7000 Series Order Picker.

Referring now to FIG. 5, the vehicle body 301 of the materials handling vehicle 300 may be described as comprising a fork side 303 and a power unit side 304, with the fork carriage assembly 310 positioned at the fork side 303 of the vehicle body 301 and being movably coupled to the mast assembly 302. The materials handling vehicle 300 may also comprise an operator compartment 307 that may also be movably coupled to the mast assembly 302. This operator compartment 307 may be positioned between the fork carriage assembly 310 and the power unit side 304 of the vehicle body 301. In embodiments, the materials handling vehicle 300 does not include the operator compartment 307.

Referring again to FIG. 1I, a variety of technologies may be provided to facilitate partial or fully autonomous navigation of the materials handling vehicle 300, including conventional, or yet-to-be developed technology. For example, and not by way of limitation, radio frequency identification (RFID) tags may be embedded in the inventory transit surface 110, or secured to various warehouse objects, to help facilitate partially or fully autonomous navigation. Wire guidance systems, which are well documented in the art, may also be employed to help facilitate partially or fully autonomous navigation. In one contemplated embodiment, RFID tags embedded in the inventory transit surface 110 may be used in conjunction with a wire guidance system. In which case, it may be advantageous to embed the RFID tags 230 at vehicle stop locations, pick-place locations, tote transfer zones, transfer node locations, or other significant navigational markers along a racking system aisle, as shown in FIG. 1I. Partially or fully autonomous navigation may also be implemented, by way of non-limiting examples, through laser-based navigation, time of flight cameras, environmental based location, overhead feature-based localization, illumination-invariant feature detection, map partitioning, pre-positioned object-based localization, and/or transversal edge detection based localization. The vehicle stop locations may be recorded in a navigation map in the navigation subsystem 360 (FIG. 12) of the materials handling vehicle 300 such that physical RFID tags 230 are not needed for the materials handling vehicle 300 to position itself correctly at a vehicle stop location.

Referring to FIG. 1I, the mobile storage carts 400 may be presented as a multi-level storage cart 400 with individual container bays 430 that are configured to accommodate at least one tote 213 which can carry a plurality of different types of goods. In this embodiment, the mobile storage carts 400 are structurally configured to stand on an inventory transit surface 110 while permitting transporter travel there beneath. Specifically, the mobile storage cart 400 comprises a transporter access opening 510 that is sized and configured to permit the transporter 500 to enter and exit through one or more of a plurality of transporter access openings 510 along the inventory transit surface 110. Furthermore, the mobile storage cart 400 comprises at least two vertically-oriented fork slots 450 (shown in FIG. 5).

Figure 1A:
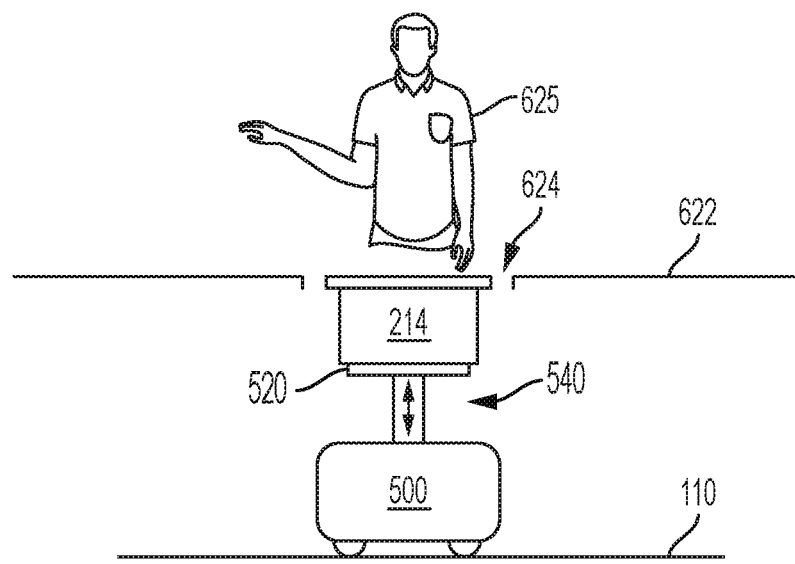
FIG. 1A illustrates a goods selection terminal including an operator platform, a goods access portal, an operator, a transporter, and a target tote according to various embodiments shown and described herein.
Figure 1B:
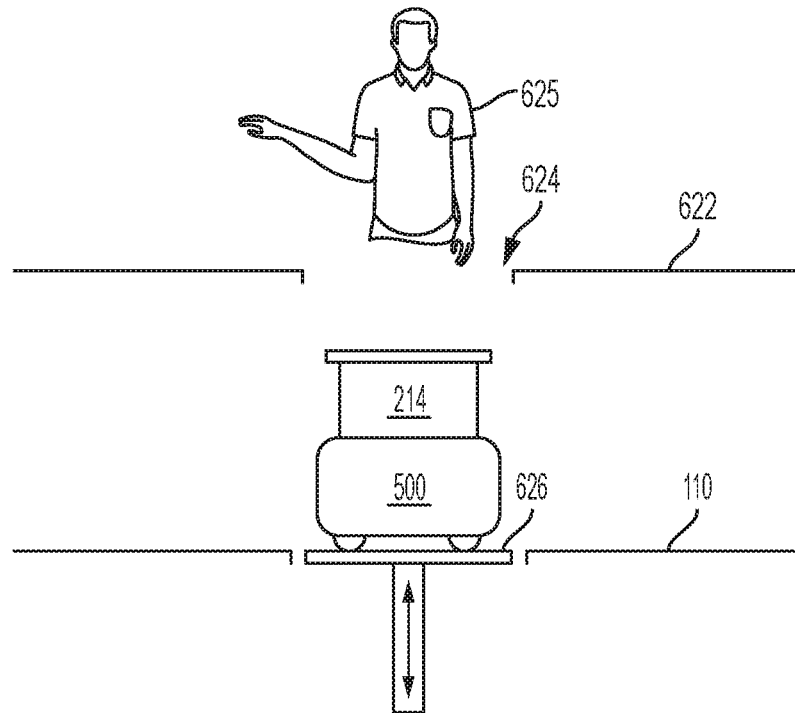
FIG. 1B illustrates a goods selection terminal including an operator platform, a goods access portal, an operator, a transporter, and a target tote according to various embodiments shown and described herein.
Figure 1C:
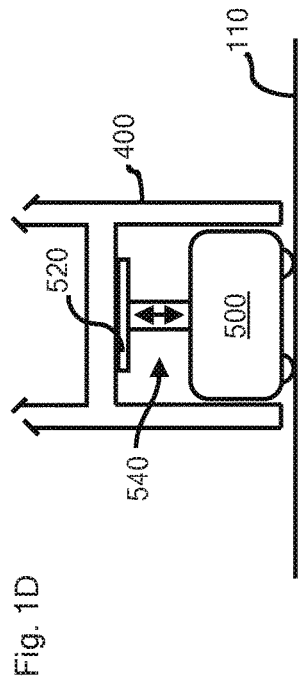
FIG. 1C illustrates a mobile storage cart and a transporter according to various embodiments shown and described herein.
Figure 1D:
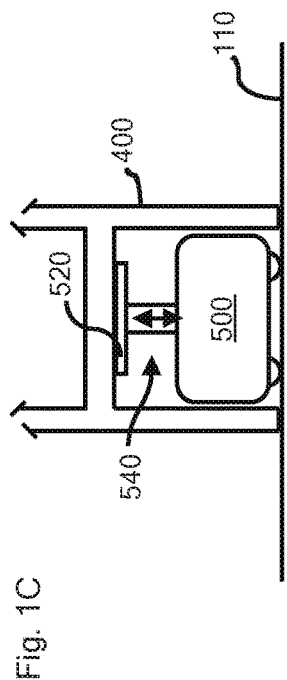
FIG. 1D illustrates a mobile storage cart and a transporter according to various embodiments shown and described herein.
Figure 1E:
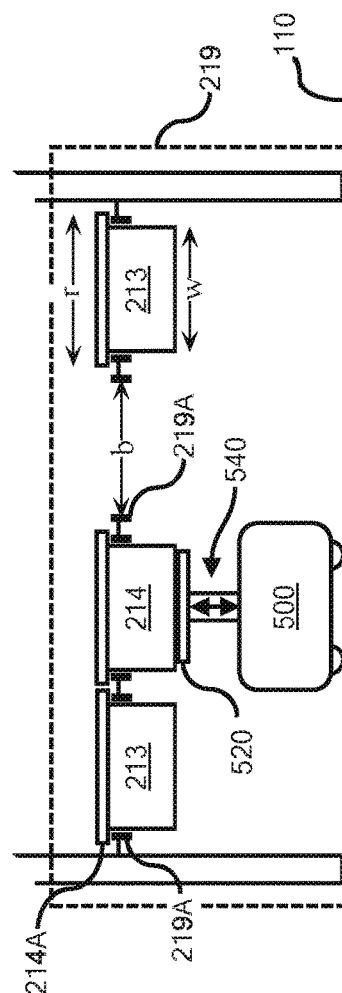
FIG. 1E illustrates a tote transfer zone, a plurality of totes, and a transporter according to various embodiments shown and described herein.
Figure 1F:
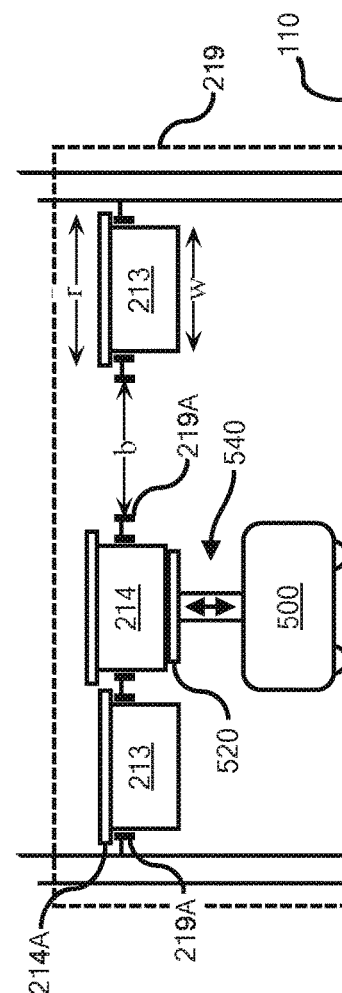
FIG. 1F illustrates a tote transfer zone, a plurality of totes, and a transporter according to various embodiments shown and described herein.
Figure 1G:
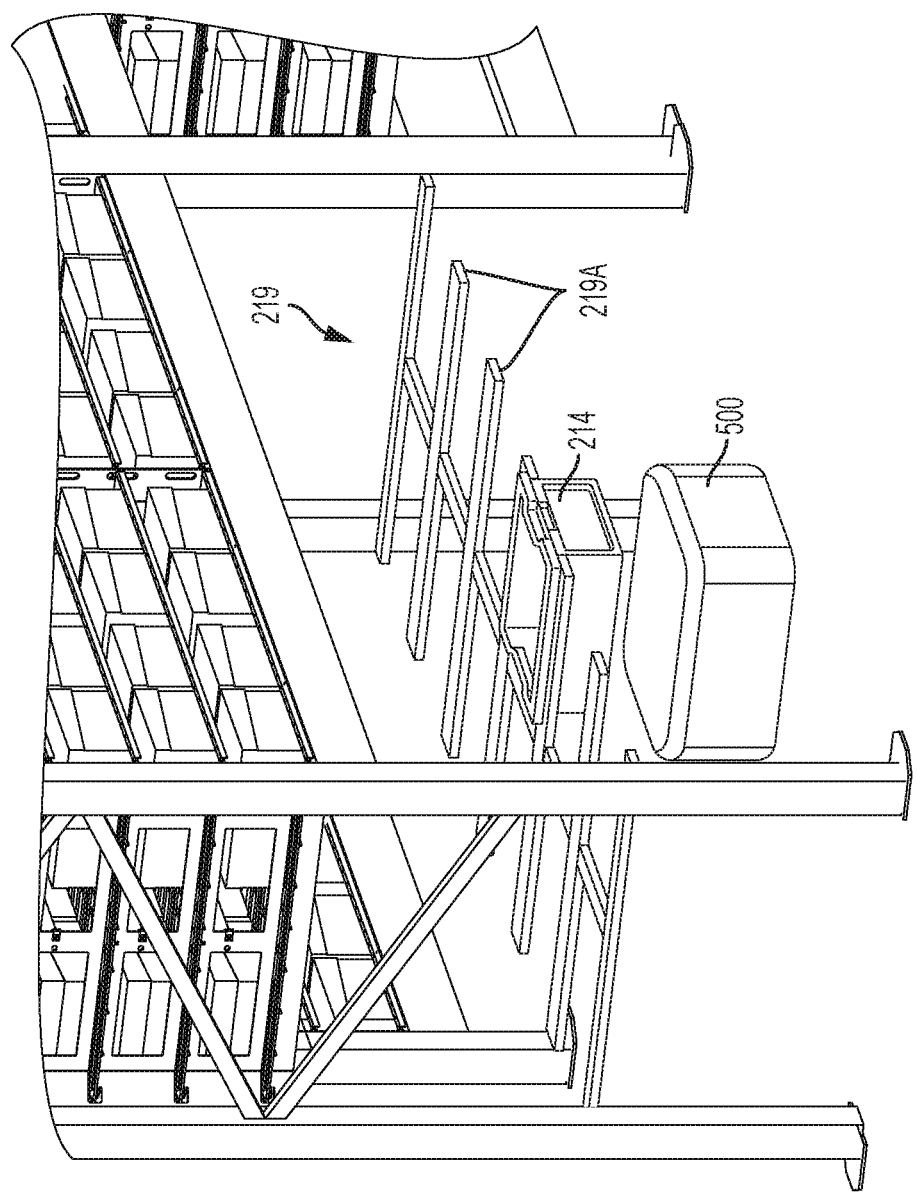
FIG. 1G illustrates a tote transfer zone, a tote, and a transporter according to various embodiments shown and described herein.

Referring to FIGS. 1A-1G and 1I, the transporter 500 comprises transporter-based engagement hardware 540 that enables the transporter 500 to transport mobile storage carts 400 from one or more mobile storage cart transfer nodes 420 to one or more goods receiving stations 610 of the goods-to-man warehousing system 600. For example, the transporter 500 may feature a lifting surface 520 (shown in FIG. 1A) and be structurally configured to lift a mobile storage cart 400 off of the inventory transit surface 110 upon which the mobile storage cart 400 is supported by elevating the transporter lifting surface from a traveling height (as shown in FIGS. 1B and 1G) to a cart contacting height (as shown in FIG. 1C) and then to a transporting height (as shown in FIGS. 1D and 1F). Referring back to FIG. 1I, each of the mobile storage carts 400 may be structurally configured to permit the transporter 500 to enter and exit a lifting zone 530 beneath the mobile storage cart 400 in at least two orthogonal directions, with the lifting surface of the transporter 500 at the traveling height.

Figure 1H:
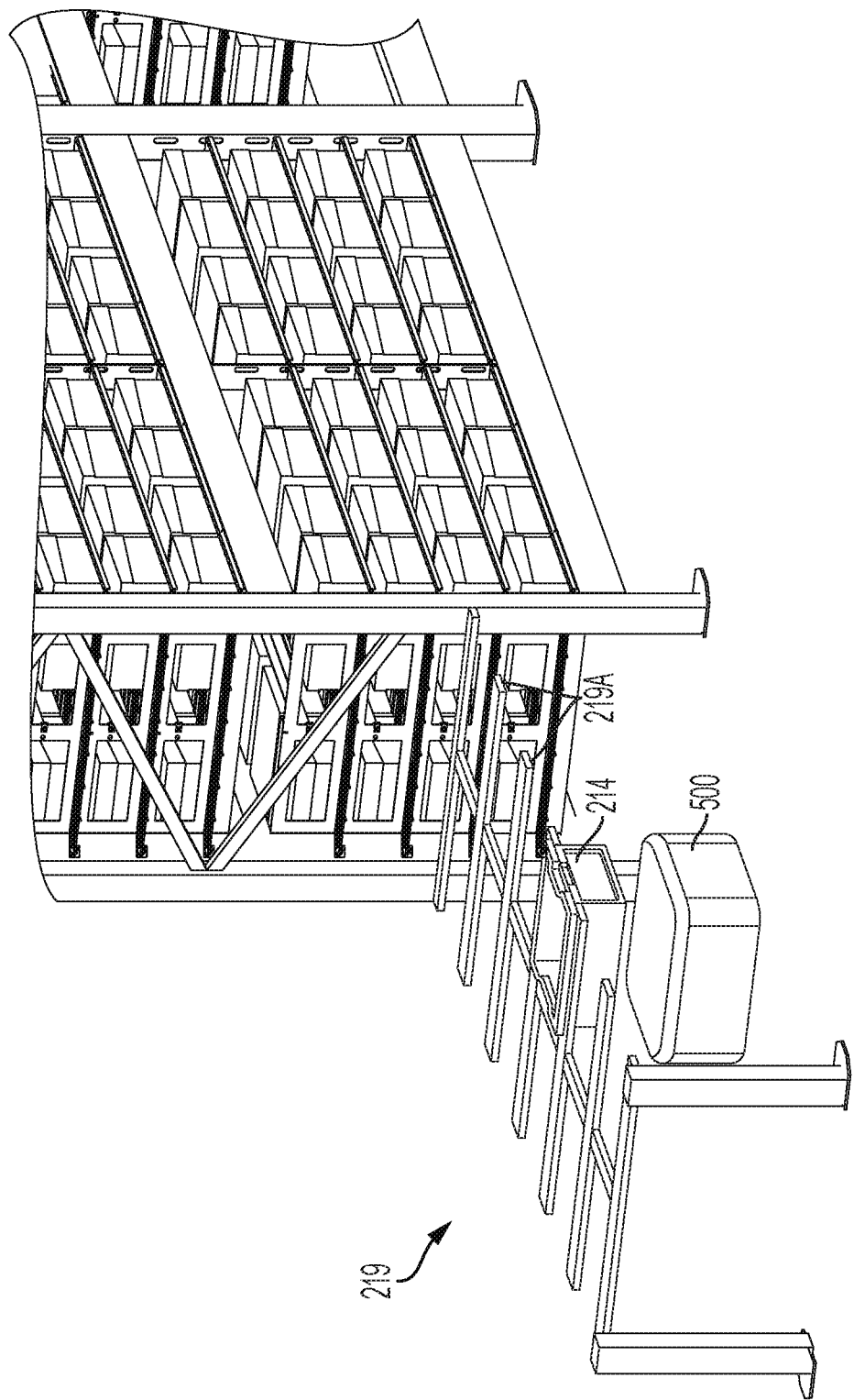
FIG. 1H illustrates a tote transfer zone, a tote, and a transporter according to various embodiments shown and described herein.
Figure 1:
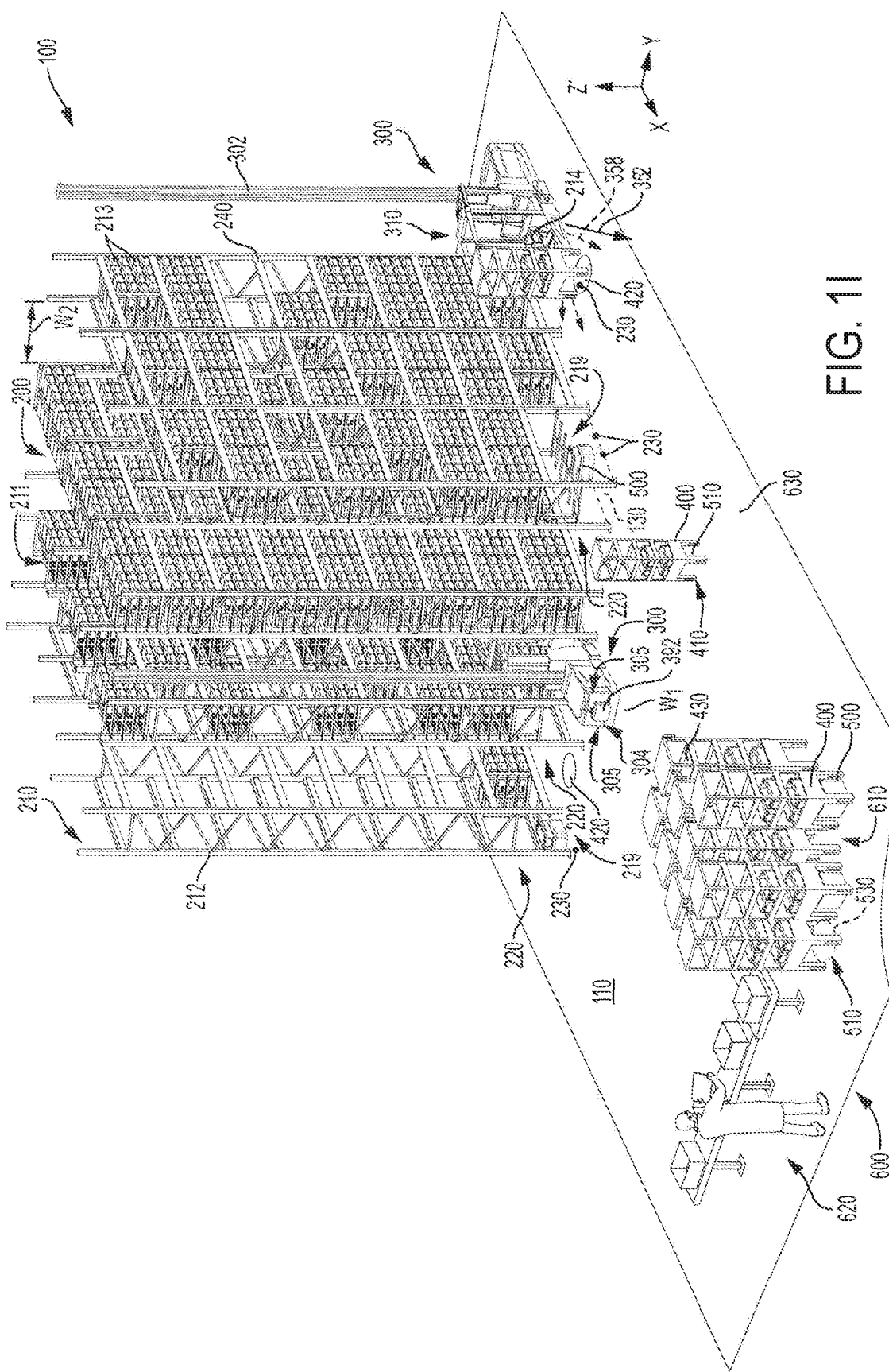
FIG. 1I illustrates a goods storage and retrieval system including a multi-level warehouse racking system, a plurality of materials handling vehicles, a plurality of totes, a plurality of transporters, and a plurality of mobile storage carts according to various embodiments shown and described herein.
Figure 2:
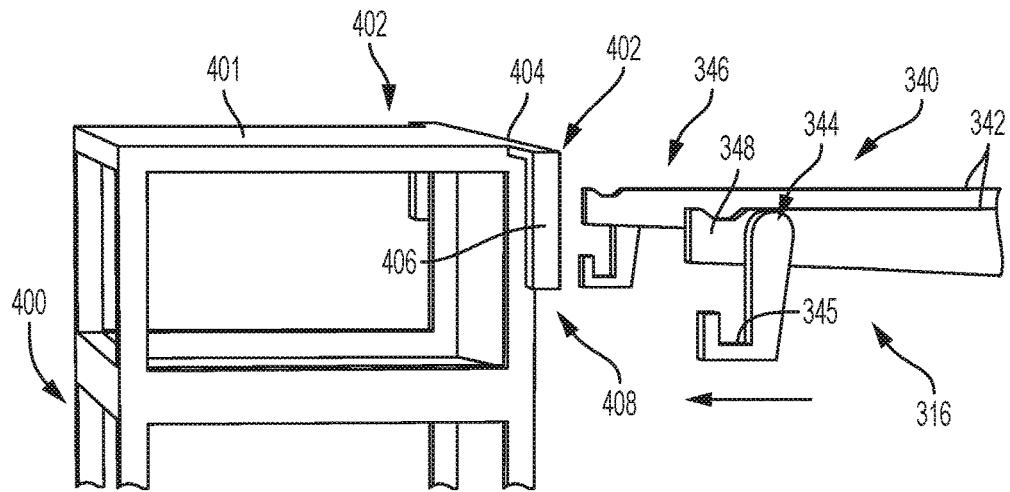
FIG. 2 illustrates a materials handling vehicle engaging a mobile storage cart according to various embodiments shown and described herein.
Figure 3:
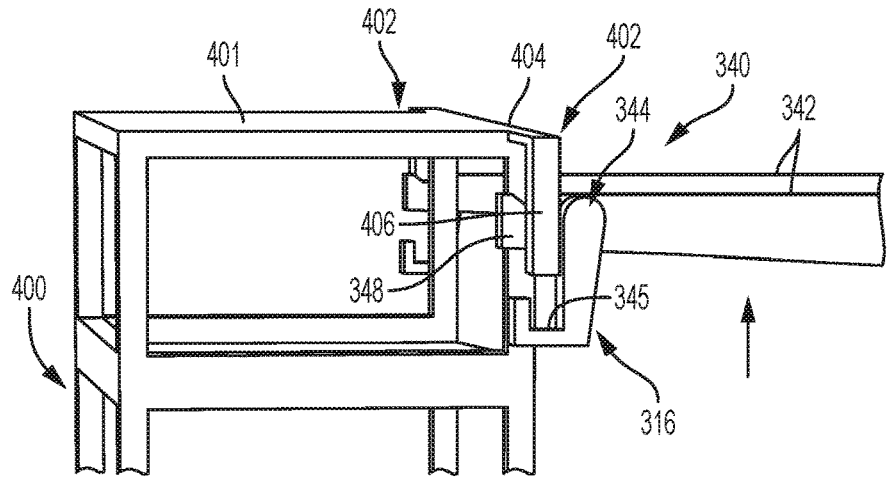
FIG. 3 illustrates a materials handling vehicle engaging a mobile storage cart according to various embodiments shown and described herein.
Figure 4:
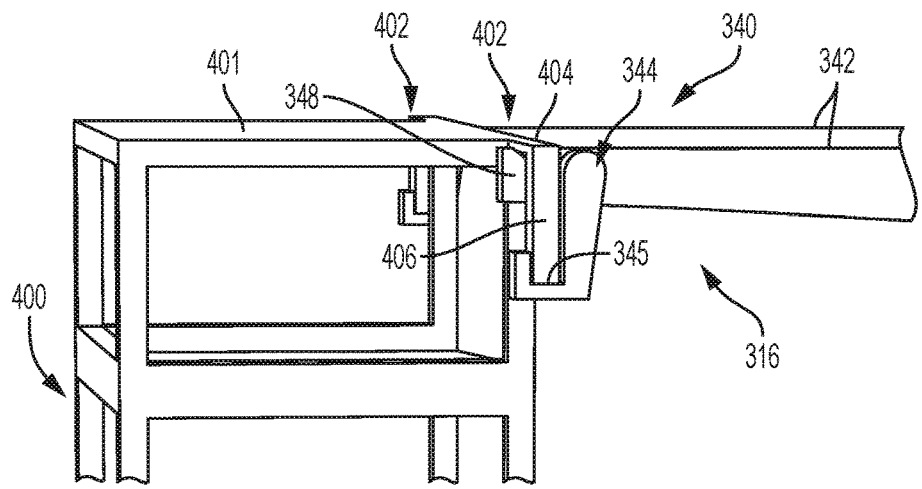
FIG. 4 illustrates a materials handling vehicle engaging a mobile storage cart according to various embodiments shown and described herein.

Similarly, the transporter 500 may feature a lifting surface 520 and be structurally configured to lift the target tote 214, as shown in FIGS. 1E-1F. Referring to FIGS. 1I, 1E-1G, 7A, and 7B, the target tote 214 has a tote width of t and comprises a pair of protruding rims 214A positioned on opposite sides of the target tote 214. These protruding rims 214A define a target tote rimmed width r. Totes may be a variety of different sizes, varying from smaller than the lifting surface 520 of the transporter 500 to larger than the lifting surface 520 of the transporter 500. In some embodiments, the bottom of the tote 214 may be approximately the same size as the lifting surface 520 of the transporter 500. In some embodiments, the length and width of the tote 214 may be approximately equal. In other embodiments, the length of the tote 214 may be greater than the width of the tote 214. In embodiments, the width and height of the tote 214 may be approximately equal. In other embodiments, the height of the tote 214 may be less than the width of the tote 214. In other embodiments, the height of the tote 214 may be greater than the width of the tote 214. The tote transfer zone 219 comprises a plurality of tote suspension tracks 219A defined by a track spacing b. For the totes 214 to rest securely on tote suspension tracks 219A of the tote transfer zone 219, $t<b<r$. The tote transfer zone 219 is elevated above an inventory transit surface 110 of the goods storage and retrieval system 100 such that the totes 214 stored therein are accessible by the transporter 500. The tote transfer zone 219 may form a bottom level of the multi-level warehouse racking system 200. In some embodiments, as shown in FIG. 1H, the multi-level warehouse racking system 200 comprises a first rack and a second rack arranged on opposite sides of a racking system aisle. The first and second racks define end points of the racking system aisle and the tote transfer zone 219 extends past the end points of the racking system aisle. In an alternative embodiment, the tote transfer zone 219 does not extend past the end points of the racking system aisle and is instead inset within the rack of the multilevel warehouse racking system 200. When the tote transfer zone 219 is inset within the rack 210 of the multilevel warehouse racking system 200, the tote transfer zone 219 may form a bottom level of the multilevel warehouse racking system 200.

In embodiments, the transporter 500 may be structurally configured such that the lifting surface 520 lifts the target tote 214 relative to a tote supporting surface (in some embodiments, this may include the tote suspension tracks 219A) of the tote transfer zone 219. The lifting surface 520 of the transporter 500 may lift the target tote 214 by elevating the transporter lifting surface 520 from the traveling height to a rack height (shown in FIG. 1E) and then to the transporting height (shown in FIG. 1F). The lifting surface 520 of the transporter 500 may be structurally configured to lower the target tote 214 onto a tote supporting surface (such as the tote suspension tracks 219A) of the tote transfer zone 219 by lowering the transporter lifting surface 520 from the transporting height (shown in FIG. 1F) to the rack height (shown in FIG. 1E), such that the protruding rims 214A of the target tote 214 rest on the tote suspension tracks 219A.

The multilevel warehouse racking system 200 may comprise a plurality of racking system aisles 220 between the racks 210. FIG. 1I illustrates an embodiment of a rack 210 of the multilevel warehouse racking system 200 having a plurality of shelves 240 having at least a portion configured to support a rack module 211 configured to store one or more totes 213. In embodiments, the rack module 211 may be similar to or the same as the rack modules disclosed in U.S. Patent Application Publication 2017/0334644. The transporter 500 may be further configured to transport the mobile storage cart 400 within, into, and out of the racking system aisles 220. Further, the mobile storage carts 400 may be structurally configured for a transporter 500 to travel there beneath by, for example, ensuring that a bottom surface of a lowest storage level of each of the mobile storage carts 400 has a height exceeding the traveling height of the transporter lifting surface of the transporter 500. As shown in FIGS. 1C and 1D, the lifting surface 520 of the transporter 500 may lift the mobile storage cart 400 by elevating the transporter lifting surface 520 from the traveling height to an engagement height (shown in FIG. 1C) and then to the transporting height (shown in FIG. 1D). Referring again to FIG. 1I, in embodiments, the travel path 130 beneath the multilevel warehouse racking system 200 for the transporter 500 is a travel path extending along the inventory transit surface 110, in a storage plane defined by the distributed array of racks 210, which follow the shape of the distributed array of racks 210.

Referring now to FIGS. 5, 6, and 12, as stated previously, the materials handling vehicle 300 further includes a picking attachment 320. The picking attachment 320 may be added as a vehicle retrofit such that the picking attachment 320 and materials handling vehicle 300 collectively define dual axis vertical displacement. More specifically, as a non-limiting example, the mast assembly 302 and the mast assembly control unit 374 may be configured to move the fork carriage assembly 310 along a vertical axis Z', and the picking attachment 320, which comprises the X-Y-Z-Ψ positioner 322, may be secured to the fork carriage assembly 310. The vehicular controller(s) of the materials handling vehicle 300 executes vehicle functions to use the X-Y-Z-Ψ positioner 322 of the picking attachment 320 to engage and disengage a target tote 214 positioned in the multilevel warehouse racking system 200 with the picking attachment 320. The mast assembly 302, mast assembly control unit 374, and the picking attachment 320 are collectively configured such that movement of the X-Y-Z-Ψ positioner 322 along the Z-axis 328 by the picking attachment 320 is independent of movement of the fork carriage assembly 310 along the vertical axis Z' by the mast assembly 302 and mast assembly control unit 374. It is noted that "independent" movement means that the X-Y-Z-Ψ positioner 322 can effectuate vertical displacement without relying on movement of the fork carriage assembly 310 along the vertical axis Z'.

In embodiments, the mast assembly 302, mast assembly control unit 374, and the picking attachment 320 are collectively configured such that movement of the X-Y-Z-Ψ positioner 322 along the Z-axis 328 by the picking attachment 320 is supplemented by movement of the fork carriage assembly 310 along the vertical axis Z' by the mast assembly 302 and mast assembly control unit 374. "Supplemental" movement contemplates that, since the picking attachment 320 is secured to the fork carriage assembly 310, movement of the X-Y-Z-Ψ positioner 322 along the Z-axis 328 by the picking attachment 320 can also result from movement of the fork carriage assembly 310 (for example, with respect to the mast assembly 302) along the vertical axis Z'.

Referring to FIGS. 6-9, the X-Y-Z-Ψ positioner 322 may comprise a slide-out 334 that is configured to extend and retract to engage the target tote 214. The slide-out 334, which may be a telescoping assembly, is provided with hardware that selectively engages the target tote 214 to push and pull the target tote 214 into, and out of, a warehouse shelf 240 (shown in FIG. 1I), a container bay 430 of the mobile storage cart 400 (shown in FIG. 1I), or the transporter lifting surface 520 (shown in FIG. 1E), in a sliding motion. The slide-out 334 may be configured to slide within slots 336 defined in a pair of inner side walls 338 of the picking attachment 320. In embodiments, the slide-out 334 may include slide rails, ball bearing extension slides, or both. In embodiments, and not by way of limitation, the hardware that selectively engages the target tote 214 may be a pivoting engagement fingers that pivot into and out of a sliding path of a target tote 214 for tote engagement. In embodiments, and not by way of limitation, the hardware that selectively engages the target tote 214 may be a mechanism configured to grip the target tote 214 such as, for example, at least one of a claw, a gripper, one or more vacuum cups, electromagnetic coils, an articulating arm, and the like.

Referring to FIG. 5, as stated previously, the materials handling vehicle 300 includes vehicle-based cart engagement hardware 316. The vehicle-based cart engagement hardware 316 may comprise a mobile storage cart support platform 312 defined by one or more vertically-oriented cart lifting forks 314, in which the major faces of the respective cart lifting forks 314 lie in a vertical plane. The mobile storage cart 400 may include vertically-oriented fork slots 450 that are structurally configured to receive the vertically-oriented cart lifting forks 314.

Furthermore, referring to FIGS. 2-5 and 10, the vehicle-based cart engagement hardware 316 may comprise anti-rock cart engagement hardware 340 configured to engage a top end 401 of the mobile storage cart 400. The vehicular controller(s) may be in communication with the vehicle-based cart engagement hardware 316 and may execute vehicle functions to use the vehicle-based cart engagement hardware 316 to engage a mobile storage cart 400 with the one or more cart lifting forks 314 and the anti-rock cart engagement hardware 340 of the fork carriage assembly 310.

The anti-rock cart engagement hardware 340 may comprise a pair of support arms 342 configured to engage a top end 401 of the mobile storage cart 400. The anti-rock cart engagement hardware 340 may comprise lateral anti-rock hardware wherein each support arm 342 comprises a hook subtending extension 348, and the mobile storage cart 400 comprises a pair of extension passages 408 structurally configured to permit the hook subtending extensions 348 to pass at least partially through the pair of extension passages 408. The anti-rock cart engagement hardware 340 may comprise front-rear anti-rock hardware wherein each support arm 342 comprises an anti-rock hook 344 defining a notch 345, the anti-rock hook 344 extends downwardly at a distal portion 346 of the support arm 342 to define an engagement gap between the hook subtending extension 348 and a terminal portion of the anti-rock hook 344. The mobile storage cart 400 may comprise hook engaging features structurally configured to engage the anti-rock hooks 344 of the pair of support arms 342. The pair of extension passages 408 are structurally configured to permit the hook subtending extensions 348 to pass at least partially through the pair of extension passages 408 to permit the anti-rock hooks 344 of the pair of support arms 342 to engage the hook engaging features of the mobile storage cart 400 while the pair of support arms 342 engage a top end 401 of the mobile storage cart 400. The extension passage 408 spacing is approximately equal to the spacing of the pair of support arms 342, and the extension passages 408 are large enough to permit the support arms 342 to pass therethrough.

Each support arm 342 may include an anti-rock hook 344 defining a notch 345, and a hook subtending extension 348. The anti-rock hook 344 may extend downwardly at a distal portion 346 of the support arm 342 to define an engagement gap between the hook subtending extension 348 and a terminal portion of the anti-rock hook 344. The hook engaging features may be structurally configured to engage the anti-rock hooks 344 of the pair of support arms 342. Furthermore, the mobile storage cart 400 may comprise a pair of extension passages 408 structurally configured to permit the hook subtending extensions 348 to pass at least partially through the pair of extension passages 408 to permit the anti-rock hooks 344 of the pair of support arms 342 to engage the hook engaging features of the mobile storage cart 400. In some embodiments, the hook engaging features may include vertical prongs 406.

Referring still to FIGS. 2-5 and 10, the anti-rock cart engagement hardware 340 may comprise a pair of support arm engagement features 402 disposed at and extending from a top end 401 of a mobile storage cart 400 which is supported by the cart lifting forks 314. Each support arm engagement feature 402 may include a horizontal lip 404 and a vertical prong 406. The horizontal lip 404 is configured to be supported on the hook subtending extension 348 of the support arm 342, and the vertical prong 406 is configured to be received and supported by the notch 345 in the anti-rock hook 344. In embodiments, the anti-rock cart engagement hardware 340 is configured to engage the mobile storage cart 400. In another embodiment, the anti-rock cart engagement hardware 340 is configured to engage the mobile storage cart 400 supported by the cart lifting forks 314. By way of example and not as a limitation, the anti-rock cart engagement hardware 340 is configured to engage the mobile storage cart 400 supported by the cart lifting forks 314 at a cart contact point that is vertically displaced from the mobile storage cart support platform 312 by a distance approximating a height of the mobile storage cart 400. In another embodiment, the anti-rock cart engagement hardware 340 may be configured to engage the mobile storage cart 400 supported by the cart lifting forks 314 at a pair of cart contact points that are vertically displaced from the mobile storage cart support platform 312 by a distance approximating a height of the mobile storage cart 400.

It should be understood that different suitable variations of these mobile storage carts to be engaged with the cart lifting forks 314 are within the scope of this disclosure. For example, the mobile storage cart 400 may also include a wired grid, plexiglass, or mesh insert along the sides of shelving of the mobile storage cart 400 not configured to face the materials handling vehicle 300 when engaged.

Figure 5A:
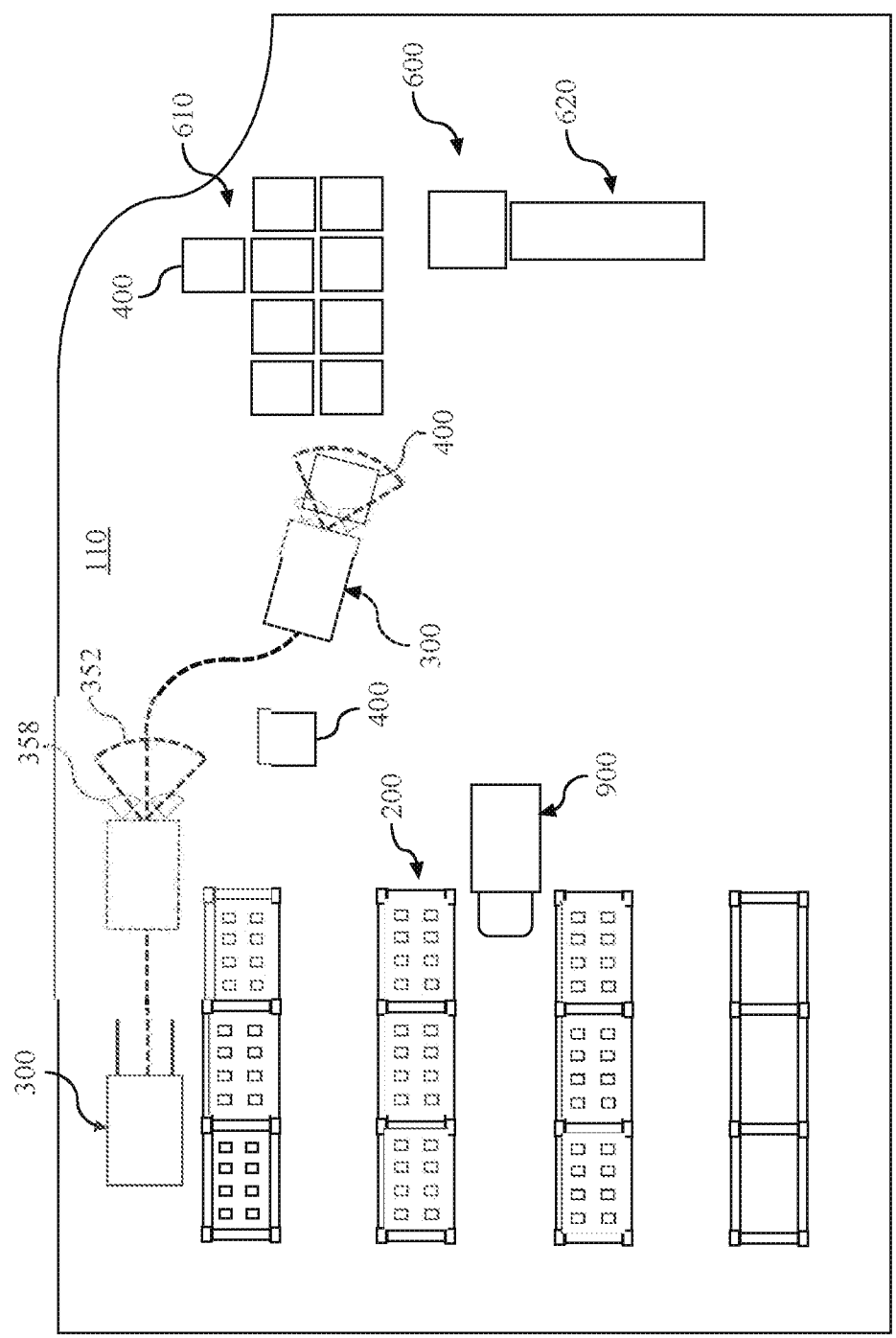
FIG. 5A is a schematic illustration of a goods storage and retrieval system including a multilevel warehouse racking system, a plurality of materials handling vehicles, and a plurality of mobile storage carts according to various embodiments shown and described herein.

Referring to FIGS. 1I, 5, 5A, 5B, 6, and 12, as previously stated, the materials handling vehicle 300 includes a cart engagement subsystem 350 (shown in FIG. 12). The cart engagement subsystem 350 is characterized by a storage cart engagement field of view 352 (shown in FIGS. 5A and 5B). The storage cart engagement field of view 352 may be defined by a vision system 354 (shown in FIG. 6) within the cart engagement subsystem 350. Referring to FIGS. 1I, 5, 5A and 12, the vehicular controller(s) of the materials handling vehicle 300 execute vehicle functions to: (i) use the navigation subsystem 360 to navigate the materials handling vehicle 300 along the inventory transit surface 110 to a localized engagement position where a cart home position 410 (as shown in FIG. 1I) is within the storage cart engagement field of view 352 (as shown in FIG. 5A), and (ii) use the cart engagement subsystem 350 to engage the mobile storage cart 400 in the cart home position 410 with the fork carriage assembly 310.

Referring to FIGS. 1I, 5, 5A, 5B, 6, and 12, the cart engagement subsystem 350 may be operatively coupled to at least one of the traction control unit 372, the braking system 371, the steering assembly 373, the mast assembly control unit 374, the carriage control unit 375, cart engagement sensors 355, and the picking attachment 320 to facilitate cart engagement. The cart engagement subsystem 350 may be coupled to these components directly, or indirectly, through the vehicular controller(s). The cart engagement subsystem 350 may be further characterized by a close approach field of view 358 (shown in FIGS. 5A and 5B) that is more restricted than the cart engagement field of view 352 (also shown in FIGS. 5A and 5B). The cart engagement subsystem 350 may transition from an initial approach mode in the cart engagement field of view 352 to a close approach mode in the close approach field of view 358 as the cart home position 410 moves into the close approach field of view 358 (shown in FIG. 5A).

Figure 5B:
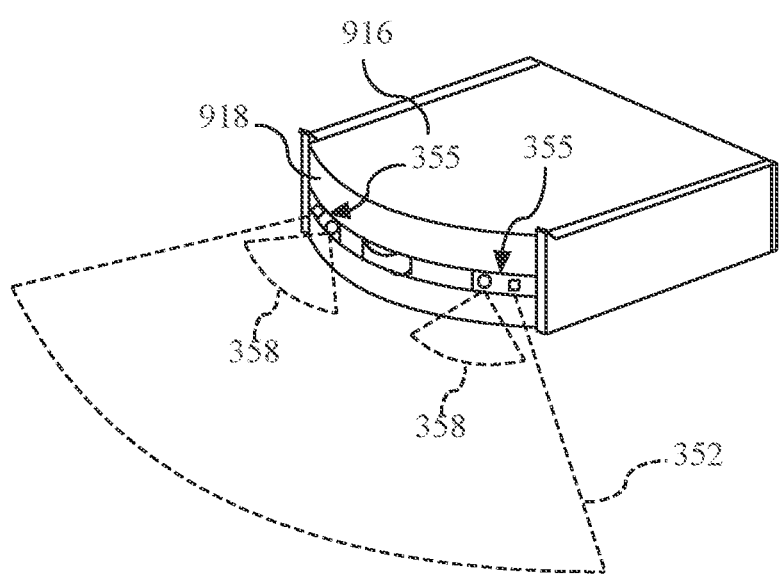
FIG. 5B illustrates a unitary materials handling platform having cart engagement sensors according to various embodiments shown and described herein.

For example, the materials handling vehicle 300 navigates to the location of the mobile storage cart 400 using the navigation subsystem 360 and positions the materials handling vehicle 300 in the localized engagement position. From there, the cart engagement subsystem 350 uses cart engagement sensors 355 (shown in FIG. 5B) to identify the mobile storage cart 400 in the initial approach mode. The cart engagement sensors 355 may be positioned within a hollow body portion of a monofork carriage assembly of a materials handling vehicle 900 (as will be subsequently described), as shown in FIGS. 5A and 5B. In alternative embodiments, the cart engagement sensors 355 may be positioned on the fork side 303 of the materials handling vehicle 300 (as shown in FIG. 5C). The cart engagement sensors 355 may include lasers, proximity sensors, cameras, or combinations thereof. The cart engagement sensors 355 may be capable of detecting the presence of a mobile storage cart 400 without any physical contact. In embodiments, the cart engagement sensors 355 may detect the mobile storage cart 400 by emitting an electromagnetic field and detecting changes in the electromagnetic field. Similarly, the cart engagement sensors 355 may detect the mobile storage cart 400 by emitting a beam of electromagnetic radiation (such as an infrared laser beam) and detecting changes in the return beam. Similar cameras and imaging equipment are disclosed in U.S. Pat. Nos. 9,990,535 B2 and 9,087,384 B2.

The cart engagement subsystem 350 uses the cart engagement sensors 355 to make course adjustments to align the cart lifting forks 314 to the vertically oriented fork slots 450 of the mobile storage cart 400 in the initial approach mode. Once the cart engagement field of view 352 no longer detects the mobile storage cart 400, the cart engagement subsystem 350 transitions from the initial approach mode to the close approach mode and makes fine adjustments to the alignment of the cart lifting forks 314 and the vertically oriented fork slots 450. The cart engagement subsystem 350 remains in the close approach mode until the cart engagement sensors 355 indicate the mobile storage cart 400 is coupled to the materials handling vehicle 300.

When the materials handling vehicle 300 sets down a mobile storage cart 400 the cart engagement subsystem 350 starts in a reverse equivalent of the close approach mode and makes fine adjustments to maintain the alignment of the cart lifting forks 314 and the vertically oriented fork slots 450 of the mobile storage cart 400 as the materials handling vehicle 300 backs away from the mobile storage cart 400. The cart engagement subsystem 350 then transitions to a reverse equivalent of the initial approach mode and the mobile storage cart 400 moves out of the close approach field of view 358. This mode can be maintained until the mobile storage cart 400 moves out of the engagement field of view 352 (or out of some other predetermined distance, e.g. from 1 meter to 3 meters) at which point the cart engagement subsystem 350 may halt and allow the navigation subsystem 360 to control navigation. It is contemplated that this localized engagement position is recorded for future cart engagement by the materials handling vehicle 300.

Referring to FIGS. 1I and 12, the navigation subsystem 360 may comprise one or more environmental sensors and an environmental database. In embodiments, the environmental sensors are configured to capture data indicative of a position of the materials handling vehicle 300 relative to the multilevel warehouse racking system 200, the inventory transit surface 110, or both. Further, the environmental database may comprise stored data indicative of the multilevel warehouse racking system 200, the inventory transit surface 110, or both. The navigation subsystem 360 may be configured to enable at least partially automated navigation of the materials handling vehicle 300 along the inventory transit surface 110 utilizing the captured data and the stored data. For example, and not by way of limitation, it is contemplated that the navigation subsystem 360 may utilize a stored warehouse map and captured images of ceiling lights or sky lights to enable navigation, as is disclosed in U.S. Pat. No. 9,174,830 issued on Nov. 3, 2015, (CRNZ 0053 PA), U.S. Pat. No. 9,340,399 issued on May 17, 2016, and other similar patents and patent publications. Additional suitable environmental sensors include, but are not limited to, inertial sensors, lasers, antennae for reading RFID tags, buried wires, WiFi signals, or radio signals, global positioning system (GPS) sensors, global navigation satellite system (GNSS) sensors, or combinations thereof.

In embodiments, a warehouse map is stored in a memory that is communicatively coupled to the vehicular controller(s). The vehicular controller(s) of the materials handling vehicle 300 may execute vehicle functions to use the navigation subsystem 360 to determine a localized position of the materials handling vehicle 300 with respect to the inventory transit surface 110 of a warehouse based on a position of the materials handling vehicle 300 in the warehouse in comparison with the warehouse map. The vehicular controller(s) of the materials handling vehicle 300 may further execute vehicle functions to use the navigation subsystem 360 to track navigation of the materials handling vehicle 300 along the inventory transit surface 110 based on the localized position, navigate the materials handling vehicle 300 along the inventory transit surface 110 in at least a partially automated manner, or both.

The navigation subsystem 360 may be operatively coupled to at least one of the traction control unit 372, the braking system 371, the steering assembly 373, the mast assembly control unit 374, the carriage control unit 375, and the picking attachment 320 to facilitate cart engagement. Further, the navigation subsystem 360 may be coupled to these components directly, or indirectly, through the vehicular controller(s).

As stated previously, the materials handling vehicle comprises a picking attachment. Referring further to FIG. 5, the picking attachment 320 may comprise an X-Y-Z-$\Psi$ positioner 322 and the vehicular controller(s) of the materials handling vehicle 300 may execute vehicle functions to use the X-Y-Z-Ψ positioner 322 of the picking attachment 320 to engage and disengage a target tote 214 positioned in the multilevel warehouse racking system 200 with the picking attachment 320.

As illustrated in FIG. 6, the X-Y-Z-Ψ positioner 322 may comprise an X-positioner 323 configured to move the picking attachment 320 in a first degree of freedom along a first lateral axis 324 in a lateral plane, a Y-positioner 325 configured to move the picking attachment 320 in a second degree of freedom along a second lateral axis 326 perpendicular to the first lateral axis 324 in the lateral plane, a Z-positioner 327 configured to move the picking attachment 320 in a third degree of freedom along a Z-axis 328 perpendicular to the first lateral axis 324 and the second lateral axis 326, and a rotational Ψ-positioner 329 configured to rotate the picking attachment 320 in a fourth degree of freedom about the Z-axis 328. The X-positioner 323 may comprise rails 330 configured to permit movement of the picking attachment 320 along the first lateral axis 324. The Y-positioner 325 may comprise rails 331 configured to permit movement of the picking attachment 320 along the second lateral axis 326. The Z-positioner 327 may comprise a vertical displacement mechanism configured to slidably engage with a post 332 of the fork carriage assembly 310 for vertical displacement with respect to the fork carriage assembly 310. The rotational Ψ-positioner 329 may comprise a shaft 333 configured to permit rotation of the picking attachment 320 about the Z-axis 328. Such "rails" may include mechanical engagement components such as one or more tracks fixed on an upright support, each including an engagement mechanism configured to engage with a corresponding engagement mechanism of a respective positioner for a sliding engagement. For example, an engagement mechanism of a rail may be one of a notch or a protrusion configured to slidably engage with the notch, and the corresponding engagement mechanism may be the other of the notch or the protrusion. As a non-limiting example, the tracks may be bars made of metal such as stainless steel or a suitable material understood to be within the scope of this disclosure.

Figure 7:
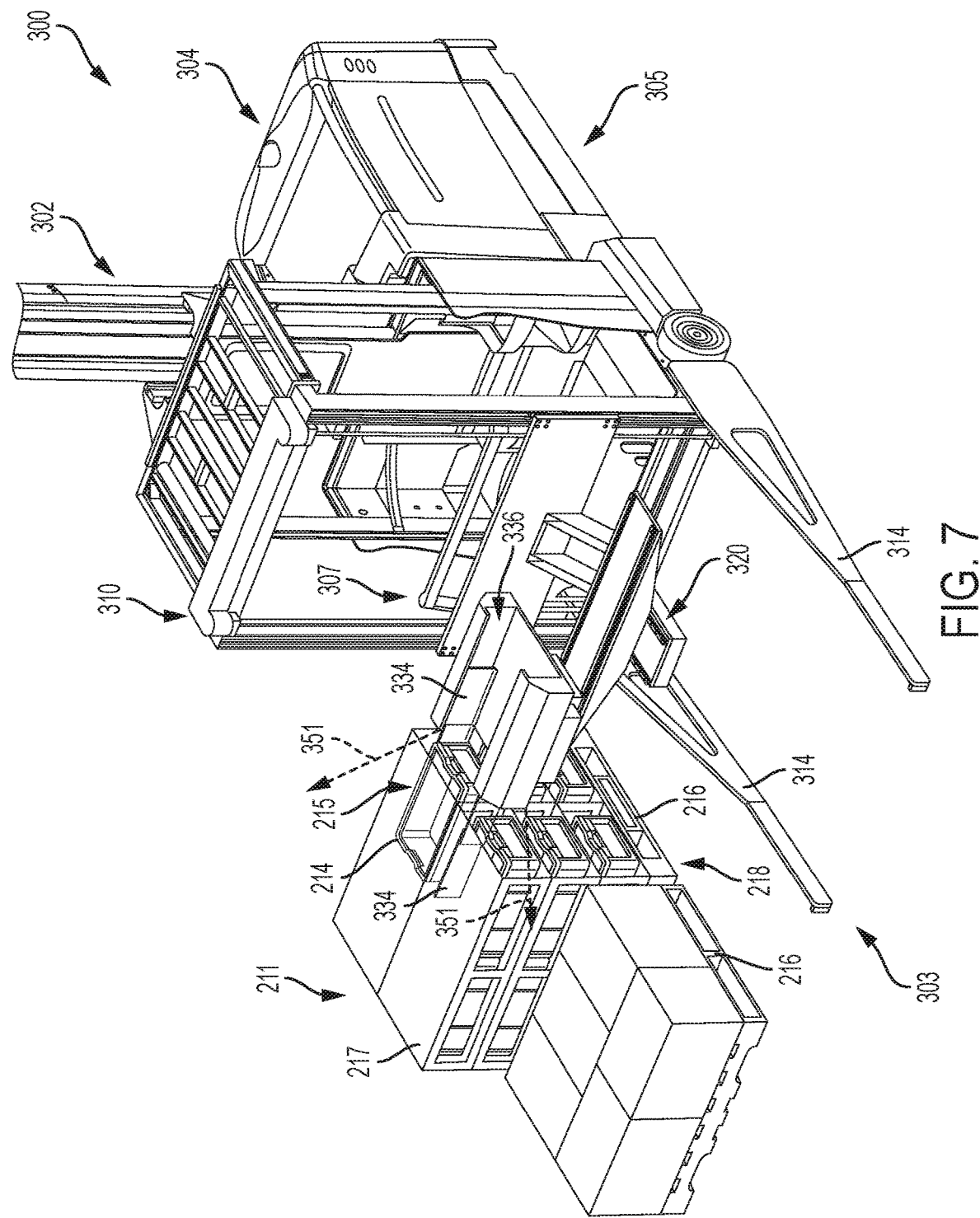
FIG. 7 illustrates the picking attachment and the materials handling vehicle of FIG. 5 in a position in which a slide-out of the picking attachment is in an extended position to either retrieve the target tote from, or store the target tote on, a rack module according to various embodiments shown and described herein.
Figure 7A:
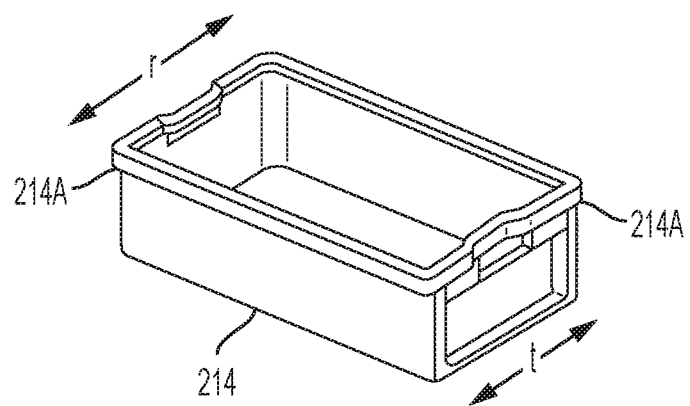
FIG. 7A illustrates a target tote according to various embodiments shown and described herein.
Figure 7B:
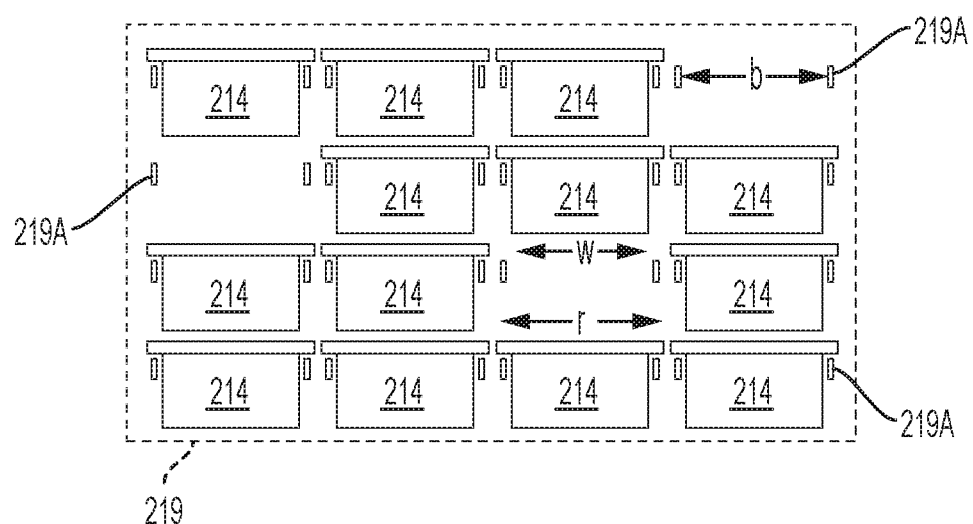
FIG. 7B illustrates a tote transfer zone and a plurality of target totes according to various embodiments shown and described herein.
Figure 8:
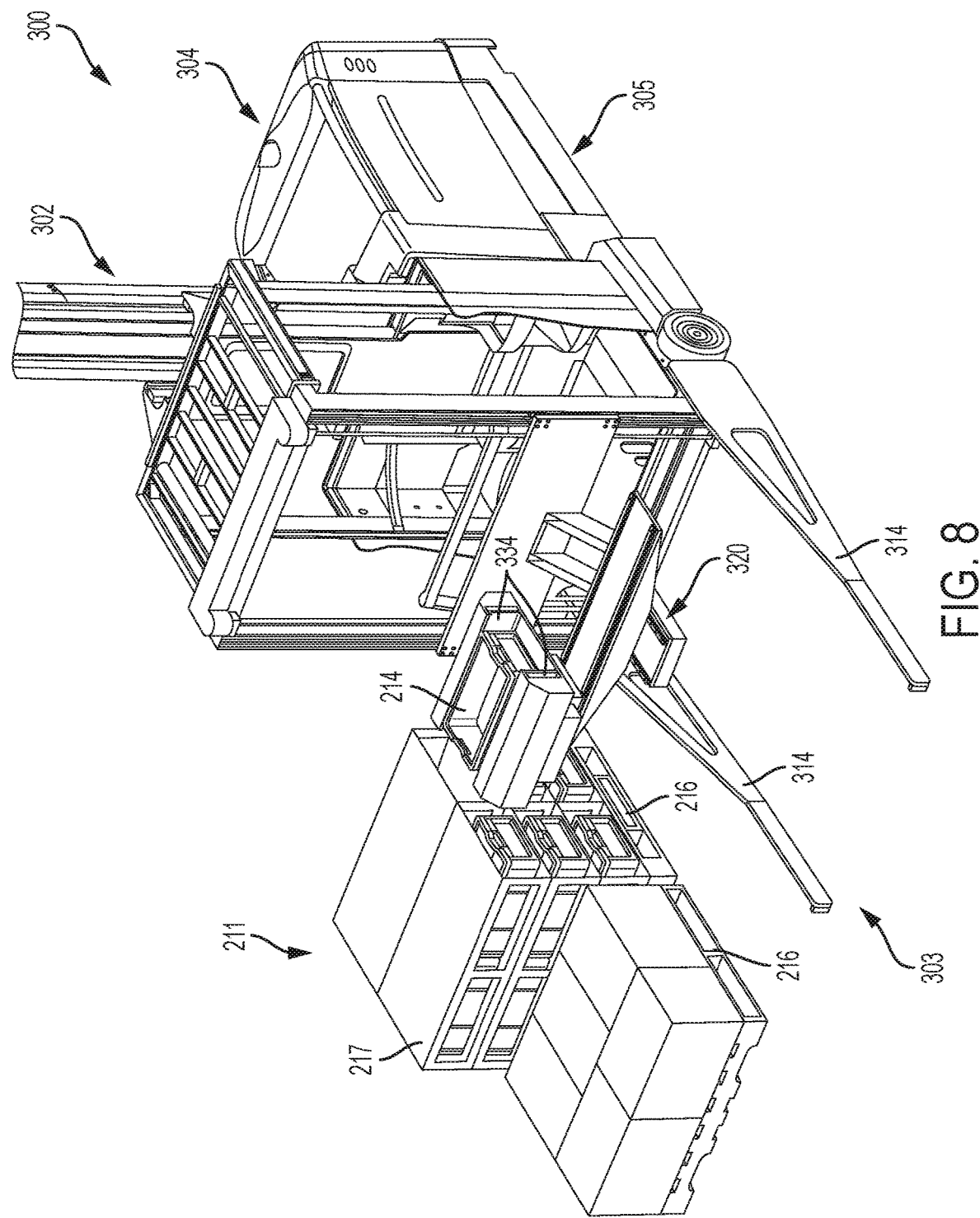
FIG. 8 illustrates the picking attachment and the materials handling vehicle of FIG. 5 in a position in which the slide-out of the picking attachment has positioned the target tote in the picking attachment in a secured position according to various embodiments shown and described herein.

The materials handling vehicle 300 may further comprise a picking attachment subsystem 321, which is illustrated schematically in FIG. 12, in communication with the vehicular controller(s) of the materials handling vehicle 300. As is illustrated in FIG. 6, the picking attachment subsystem 321 comprises the picking attachment 320 (including the X-Y-Z-Ψ positioner 322) and a time-of-flight (TOF) system 356. The picking attachment subsystem 321 is configured to use the TOF system 356 to generate a target TOF depth map of a target tote 214 (shown in FIG. 6). In embodiments, the target tote 214 may be positioned in a shelf unit 217 of a rack bay 218 of the rack module 211 (as shown in FIG. 7). Additionally or alternatively, the target tote 214 may be positioned in the tote transfer zone 219 (as shown in FIGS. 1I, 1G, and 1H). In embodiments, the target tote 214 may be positioned on the transporter (not shown). Referring to FIGS. 6-8, the vehicular controller(s) of the materials handling vehicle 300 may execute vehicle functions to use the X-Y-Z-Ψ positioner 322 of the picking attachment subsystem 321 to engage the target tote 214 with the picking attachment 320 based on the target TOF depth map. For example, the picking attachment 320 engages the target tote 214 or a target pallet with the aid of a TOF depth map, which is particularly useful for rotational (Ψ) positioning about the Z axis. Rotational adjustments may compensate for target tote 214 rotation or rotational error in the materials handling vehicle 300. The navigation subsystem 360 may be configured to position the materials handling vehicle 300 such that the target tote 214 is within a tote engagement field of view 351 of the TOF system 356.

Referring to FIGS. 1I, 6-8, and 12, the vision system 354 may also be part of the navigation subsystem 360, and the multilevel warehouse racking system may comprise a target fiducial 216 associated with the target tote 214. The navigation subsystem 360 may be configured to position the materials handling vehicle 300 such that the target fiducial 216 is within a field of view of the vision system 354 to visualize the target fiducial 216 for identification purposes. The navigation subsystem 360 may further be configured to utilize the target fiducial 216 to position the materials handling vehicle 300 such that the target tote 214 is within the tote engagement field of view 351 of the TOF system 356. In embodiments, the vision system 354 may be configured to read the target fiducial 216 to identify the target tote 214 and verify that the correct target tote 214 is within the field of view of the vision system 354. For example, it is contemplated that suitable target fiducials 216 may include markings or tags on the multilevel warehouse racking system 200, or distinctive elements of the multilevel warehouse racking system 200 itself. The target fiducial 216 may be a barcode or any other two-dimensional visual machine-readable data representation. An example is depicted in FIG. 7 with respect to a target fiducial 216 disposed on a rack module 211 such as a shelf unit 217. Rack modules within the scope of this disclosure may have different numbers of slots to position items such as totes within, and a fiducial such as the target fiducial 216 attached to each rack module 211 may be configured to identify the number of slots per respective module. Once a position of the target fiducial 216 is recorded as an X-Y-Z position on the warehouse map, a position of the totes (including, for example, the target tote 214) within the shelf unit 217 will be known as well. An entire rack module including or empty of one or more totes may be picked as described herein from a storage location such as the shelf unit 217 or a target tote 214 may be individually picked as described herein. A target tote 214 to be picked may not include a target fiducial 216 but may be stored in a storage location such as a shelf unit 217 that includes the target fiducial 216 to guide the materials handling vehicle 300 to the localized position of the shelf unit 217 to engage the target tote 214 as described herein. Alternatively, both the rack module 211, such as the shelf unit 217, and the target tote 214 may include target fiducials 216 to guide engagement of the target tote 214 with the picking attachment 320 as described herein.

With reference to FIGS. 7, 8, 9 and 12, a picking scheme as described herein may include travel to a tote location 215 of a target tote 214 within a rack module 211 to engage the target tote 214. In other embodiments, the target tote 214 may be positioned in the tote transfer zone or positioned on the transporter as previously described. Another picking scheme may include travel to a rack module 211 within a rack bay 218 of the multilevel warehouse racking system 200 and visualization of a target fiducial 216 of the rack module 211 to pick, based on, for example, known coordinates of the target fiducial 216, the entire rack module 211 or a target tote 214 from within the rack module 211. Further, a picking scheme may include dual target fiducial visualization and include travel to a rack module 211 within a rack bay 218 of the multi-level warehouse racking system 200, visualization of a target fiducial 216 of the rack module 211, movement to a location of a target tote 214 within the visualized rack module 211 based on information received from visualization of that rack module 211, visualization of the target tote 214 within the rack module 211, and engagement of the target tote 214 by the picking attachment 320 as described herein. Thus, the navigation subsystem 360 may be configured to position the materials handling vehicle 300 such that the target fiducial 216 of a shelf unit 217 of the rack module 211 is within a field of view of the vision system 354. The navigation subsystem 360 may additionally be configured to utilize the target fiducial 216 to position the materials handling vehicle 300 such that the shelf unit 217 is within a rack module field of view of the TOF system 356. The navigation subsystem 360 may further be configured to utilize a target fiducial 216 of the target tote 214 within the rack module 211 field of view to position the materials handling vehicle 300 such that the target tote 214 is within the tote engagement field of view 351 of the TOF system 356.

Figure 9:
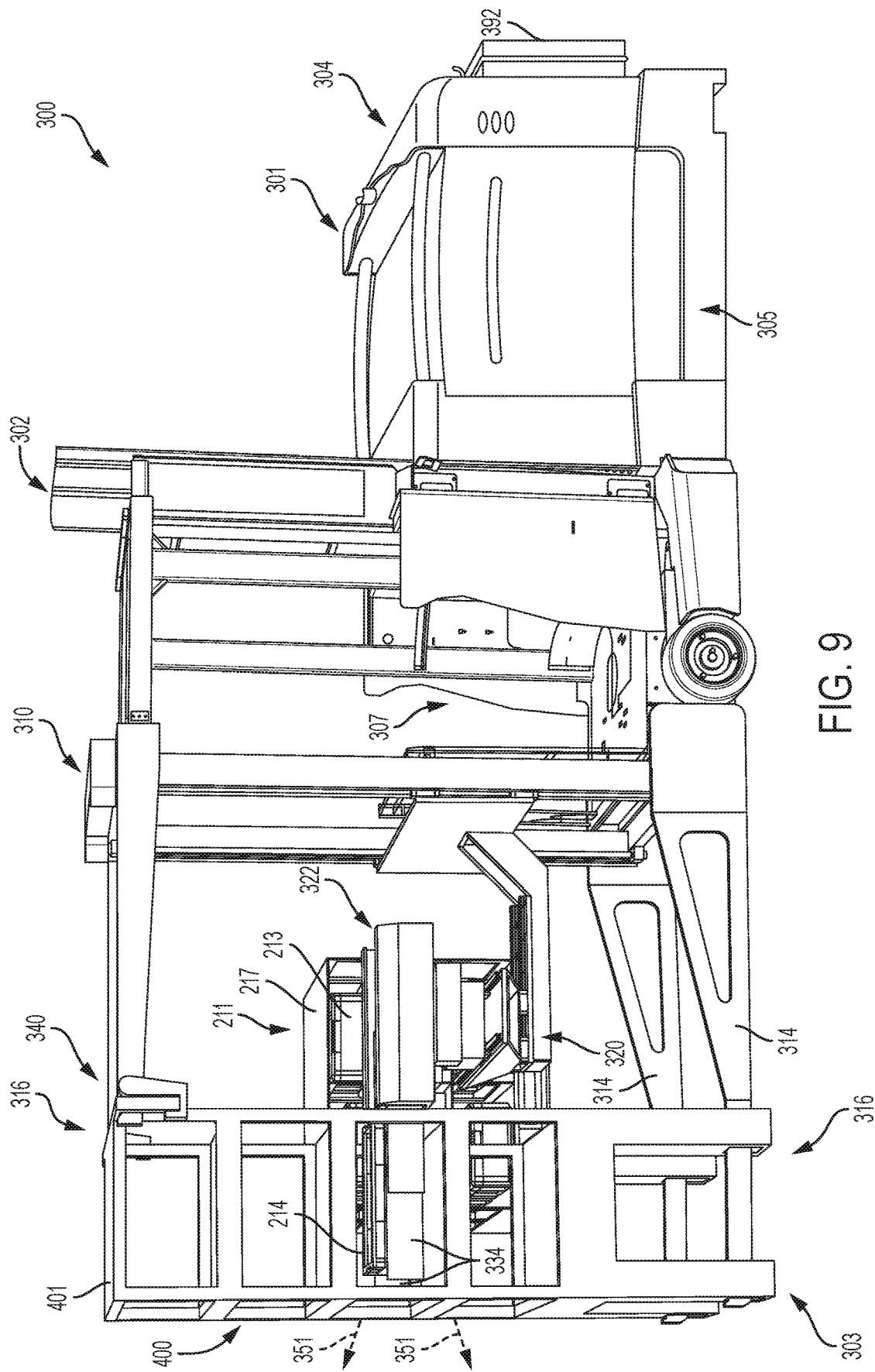
FIG. 9 illustrates the picking attachment and the materials handling vehicle of FIG. 5 in a position in which the picking attachment is in rotational alignment with a shelf of the engaged mobile storage cart and the slide-out is in an extended position to either retrieve the target tote from or store the target tote on the shelf according to various embodiments shown and described herein.
Figure 10:
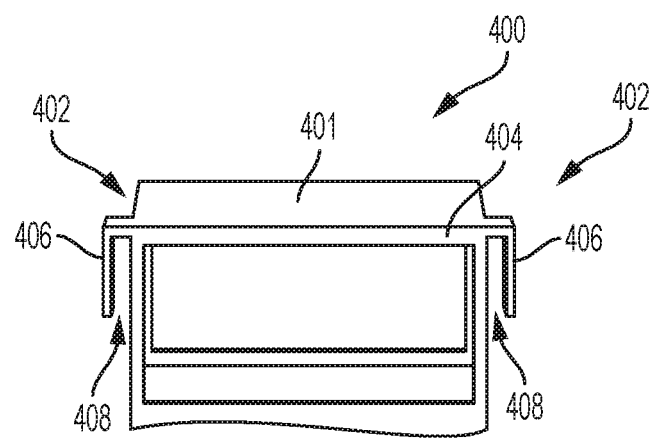
FIG. 10 illustrates a front view of the mobile storage cart according to various embodiments shown and described herein.

As illustrated in FIGS. 7 and 8, the target tote 214 may be stored within a rack module 211 such as on a shelf unit 217 of the multilevel warehouse racking system 200. In FIG. 7, the picking attachment 320 of the materials handling vehicle 300 of FIG. 5 is in a position in which a slide-out 334 of the picking attachment 320 is in an extended position to either retrieve the target tote 214 from or store the target tote 214 on the shelf unit 217. In FIG. 8, the materials handling vehicle 300 of FIG. 5 is in a position in which the slide-out 334 has positioned the target tote 214 in the picking attachment 320 in a secured position. In FIG. 9, the materials handling vehicle 300 of FIG. 5 is in a position in which the picking attachment 320 is in rotational alignment, through a rotation as described in greater detail below, with a shelf of the engaged mobile storage cart 400, and the slide-out 334 is in an extended position to either retrieve the target tote 214 from or store the target tote 214 on the shelf of the engaged mobile storage cart 400.

Referring to FIG. 1I, the picking scheme as described in reference to a target tote 214 positioned within the shelf unit 217 as shown in FIGS. 7, 8, 9 and 12 may be similarly applied to a target tote 214 positioned in the tote transfer zone 219 or positioned on the lifting surface of the transporter 500. In such embodiments, the picking attachment 320 may (i) transfer the target tote 214 between multiple levels of the multilevel warehouse racking system 200 and the transporter 500, (ii) transfer the target tote 214 between multiple levels of the multilevel warehouse racking system 200 and the tote transfer zone 219, (iii) transfer the target tote 214 between the tote transfer zone 219 and the transporter 500, and (iv) transfer the target tote 214 between the transporter 500 and the mobile storage cart 400 when the mobile storage cart 400 is engaged by the materials handling vehicle 300.

Figure 13:
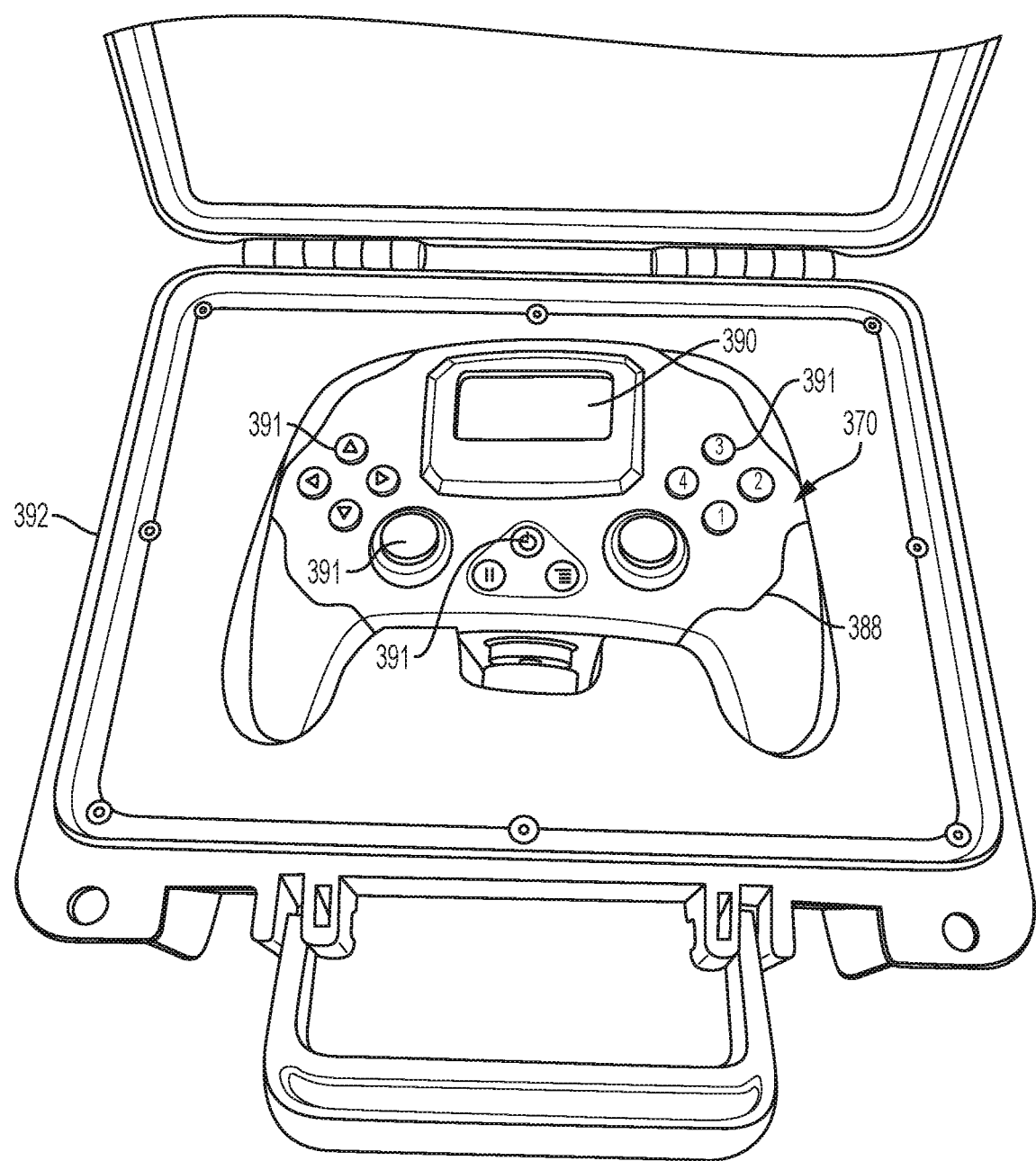
FIG. 13 illustrates the drive unit case of FIG. 5 in an open position to show the removable hand-held drive unit according to various embodiments shown and described herein.

Referring now to FIGS. 5, 12, and 13, in embodiments, a hand-held drive unit 370 is secured to the vehicle body 301 and comprises a user interface 388 and an operational command generator 389 that is responsive to the user interface 388. In alternative embodiments, the hand-held drive unit 370 may be remote from and not secured to the vehicle body 301.

The operational command generator 389 may comprise any suitable combination of conventional, or yet-to-be developed, circuitry and software that enables the hand-held drive unit 370 to send operational commands generated in response to user input at the user interface 388 to the vehicular controller(s) to control operational functions of the traction control unit 372, the braking system 371, the steering assembly 373, the mast assembly 302 through the mast assembly control unit 374, the picking attachment 320, or combinations thereof. The hand-held drive unit 370 may be secured to the vehicle body 301 so as to be accessible for removal from the vehicle body 301 from the power unit side 304 of the vehicle body 301 by an operator sharing (such as positioned on) the inventory transit surface with the wheels 306 supporting the vehicle body 301.

The vehicle body 301 may also comprise a pair of lateral sides 305 extending between the fork side 303 and power unit side 304 of the vehicle body 301, with the lateral sides 305 defining a vehicle width $w_1$. In narrow aisle environments, where when the materials handling vehicle 300 is positioned in a warehouse aisle characterized by an aisle width $w_2$, where $w_2-w_1<W$ inches where W is in a range of from about 2 inches to about 4 inches (and $w_2>w_1$), the hand-held drive unit 370 is secured to the vehicle body 301 so as to be accessible for removal by the operator sharing the inventory transit surface 110 with the materials handling vehicle 300. The equation above is an example equation for a maximum gap value, and values set forth are not contemplated to a limitation. As a non-limiting example, the hand-held drive unit 370 may be secured to a surface of the power unit side 304 of the vehicle body 301 and may be configured to permit an operator to fully control the materials handling vehicle 300 positioned in a first aisle without a need for the operator to travel down an empty, adjoining aisle next to the first aisle to get to the operator compartment 307 on the fork side 303 of the materials handling vehicle 300. In other words, a retrofitted materials handling vehicle 300 may require manual intervention on the part of an operator and, if the operator is located in the first aisle on the power unit side 304 opposite from the operator compartment 307 and unable to fit between the vehicle body 301 and the first aisle, the hand-held drive unit 370 provides a way for the operator to manually intervene without the need to get to the operator compartment 307. It is contemplated that all of the functionality of the hand-held drive unit 370 described herein is duplicated with user controls in the operator compartment 307 such that the operator may control the materials handling vehicle 300 as if the operator were within the operator compartment 307 without actually being in the operator compartment 307.

As previously referenced, the vehicular controller(s) may comprise a picking controller 376, a braking controller 377, a traction controller 378, a steering controller 379, a mast controller 380, or one or more integrated controllers, to control operational functions of the picking attachment 320, the braking system 371, traction control unit 372, the steering assembly 373, or the mast assembly control unit 374. Where the vehicular controller(s) comprises a traction controller 378 configured to control operational functions of the traction control unit 372, the user interface 388 of the hand-held drive unit 370 may comprise traction control operators 384. The traction controller 378 may be responsive to operational commands generated with the traction control operators 384 of the hand-held drive unit 370. For example, it is contemplated that the traction control operators 384, and other types of control operators described herein, can be implemented in a variety of ways, such as via virtual buttons provided on a touch screen display 390, physical inputs 391 located on the hand-held drive unit 370 (such as buttons, joysticks, etc.), any of which may be dedicated or customizable. It is contemplated, for example, that the physical inputs 391 may be customized using configurable menu options, scrolling interfaces, or other on-screen options provided at the touch screen display 390. It is also contemplated that the body of the hand-held drive unit 370 could be used as a control operator if the unit were to be provided with one or more motion sensors, such as a gyroscope, accelerometer, etc., to detect movement and/or rotation of the hand-held drive unit 370. In further contemplated embodiments, gesture tracking, gaze tracking, voice control, and other types of indirect control operators may be used.

The vehicular controller(s) may also comprise a braking controller 377 configured to control operational functions of the braking system 371. The user interface 388 of the hand-held drive unit 370 may comprise braking control operators 383. The braking controller 377 may be responsive to operational commands generated with the braking control operators 383 of the hand-held drive unit 370.

Similarly, the vehicular controller(s) may comprise a steering controller 379 configured to control operational functions of the steering assembly 373. In which case, the user interface 388 of the hand-held drive unit 370 would comprise steering control operators 385, and the steering controller 379 would be responsive to operational commands generated with the steering control operators 385.

The vehicular controller(s) may also comprise a mast controller 380 configured to control operational functions of the mast assembly control unit 374 that is configured to control the mast assembly 302. In which case, the user interface 388 of the hand-held drive unit 370 would comprise mast assembly control operators 386, and the mast controller 380 would be responsive to operational commands generated with the mast assembly control operators 386.

The vehicular controller(s) may additionally comprise a picking controller 376 configured to control operational functions of the picking attachment 320. In which case, the user interface 388 of the hand-held drive unit 370 would comprise picking attachment control operators 382, and the picking controller 376 would be responsive to operational commands generated with the picking attachment control operators 382.

The vehicular controller(s) may additionally comprise a carriage controller 381 configured to control operational functions of the carriage control unit 375, which is configured to control the fork carriage assembly 310. In which case, the user interface 388 of the hand-held drive unit 370 would comprise carriage control operators 387, and the carriage controller 381 would be responsive to operational commands generated with the carriage control operators 387.

The materials handling vehicle 300 may further comprise a camera 308 coupled to the fork carriage assembly 310, with the camera 308 being configured to send image data representing objects within a field of view of the camera 308 to the hand-held drive unit 370. The hand-held drive unit 370 may comprise a touch screen display 390 or other type of display for displaying image data representing objects within the field of view of the camera 308. In this manner, a ground-based operator can use the image data as an aide to using the hand-held drive unit 370 to control various functions of the materials handling vehicle 300. This is particularly advantageous where the field of view of the camera 308 extends beyond the field of view of an operator sharing an inventory transit surface 110 with the materials handling vehicle 300. In some embodiments, the hand-held drive unit 370 may be configured to allow an operator to view images of the picking attachment 320 and send operational commands to the picking controller 376 through picking attachment control operators 382 of the hand-held drive unit 370 to control operational functions of the picking attachment 320.

It is also contemplated that the hand-held drive unit 370 may be configured to control the field of view of the camera 308. For example, the field of view of the camera 308 may be controlled by changing the position or orientation of the camera 308, by controlling the zoom of the camera optics, by controlling an aiming direction of the camera optics, or combinations thereof. In various embodiments, the hand-held drive unit 370 is configured to control focusing optics of the camera 308. In other embodiments, the camera 308 may be coupled to the fork carriage assembly 310 by a camera positioner 309, and the hand-held drive unit 370 may be configured to control the operational functions of the camera positioner 309.

It is also contemplated that the camera 308 may be coupled to the fork carriage assembly 310 either internally or externally. An internally-coupled camera could reside at least partially within the fork carriage assembly 310, such as with a pinhole camera. An externally-coupled camera may be attached to the fork carriage assembly 310 by any suitable means, such as with coupling mechanisms (screws, bolts, etc.), attachment mechanisms (camera base-mounts, brackets, etc.), adhesives, or combinations thereof.

In many cases, it will be advantageous to ensure that the hand-held drive unit 370 is secured to a surface of the vehicle body 301 that is not located within a path of vertical movement of the fork carriage assembly 310. In this manner, by ensuring that the hand-held drive unit 370 is accessible from the power unit side 304, and not the fork side 303 of the materials handling vehicle 300, the operator will not be required to walk under the fork carriage assembly 310 to access the hand-held drive unit 370. In some embodiments, it may be sufficient to merely ensure that the hand-held drive unit 370 is secured to a surface of the vehicle body 301 that is not located at the fork side 303 of the vehicle body 301. In other embodiments, it may be advantageous to ensure that the hand-held drive unit 370 is held within a drive unit case 392, and the drive unit case 392 is secured to the vehicle body 301. For example, referring to FIG. 5, the materials handling vehicle 300 includes the drive unit case 392 housing the hand-held drive unit 370 at the power unit side 304 of the materials handling vehicle 300.

It is contemplated that the hand-held drive unit 370 described above may be secured to the materials handling vehicle 300, or may be present at a location remote from the materials handling vehicle 300. Further, the functionality of the hand-held drive unit 370 may be presented more broadly in the form of a remote controller that is communicatively coupled to the materials handling vehicle 300 through, for example, a wireless communication link. The remote controller may or may not be a hand-held and may or may not be secured to the materials handling vehicle 300. The remote controller may comprise a video link to display image data from the camera 308. Contemplated remote controllers may, for example, be presented as a desktop computer, a laptop computer, a smartphone, a tablet, a wearable computing device, or some combination thereof. It is also contemplated that the remote controller, whether hand-held or not, may be utilized in a dual mode operation where user control is facilitated from two separate remote controllers. For example, and not by way of limitation, in one type of dual mode operation, a user is able to control vehicular operations through a remote controller at a remote location, such as through a laptop computer, while also permitting the same or another user to sign in through a secured webpage or a software application loaded on a smartphone, or other hand-held device, to control such vehicular operations. Regardless of the mode of operation, it is contemplated that the remote controller may be utilized by an operator at a location that is remote from the materials handling vehicle 300, or by an operator sharing the inventory transit surface 110 with the materials handling vehicle 300.

In FIG. 1I, the goods receiving station 610 comprises a goods selection terminal 620 that is outfitted for removal of totes from the mobile storage carts 400 or from the transporters 500. In an alternative embodiment, the goods-to-man warehousing system 600 further comprises an intermediate transfer station 630 that is positioned along a mobile storage cart travel path extending from the mobile storage cart transfer node 420 to the goods receiving station 610. The mobile storage carts 400 may be positioned at the intermediate transfer station 630 and may be transferred from the goods receiving station 610 at the intermediate transfer station 630 to the goods selection terminal 620 by the transporter 500.

Referring now to FIGS. 1A and 1B, the goods selection terminal comprises an operator platform 622 above an inventory transit surface 110 of the goods storage and retrieval system 100. The operator platform 622 comprises a goods access portal 624 that is accessible by an operator 625 from above the operator platform 622 and by the transporter 500 from below the operator platform 622. As shown in FIG. 1A, the transporter 500 may be configured to elevate the transporter lifting surface to a height of the operator platform 622. In embodiments, the height of the operator platform 622 may be approximately equal to the transporting height of the transporter 500. When the transporter lifting surface is elevated to the height of the operator platform 622, the target tote 214 may be accessed by the operator 625. In an alternative embodiment, shown in FIG. 1B, the goods selection terminal 620 comprises a transporter raising surface 626 that is flush with the inventory transit surface 110, aligned with the goods access portal 624, and configured to elevate the transporter 500 from the inventory transit surface 110 of the goods storage and retrieval system 100 to the operator platform 622. When the transporter 500 is elevated to the operator platform 622, the target tote 214 may be accessed by the operator 625.

Referring again to FIG. 1I, the warehouse management computing hub is in communication with the transporter 500 and the materials handling vehicle 300, and is be programmed to instruct the transporter 500 and the materials handling vehicle 300 to coordinate engagement, transport, and disengagement of the mobile storage carts 400 and the target tote in the goods-to-man warehousing system 600. The warehouse management computing hub may be configured to manage locations of the plurality of mobile storage carts 400, the transporters 500, the materials handling vehicles 300, the mobile storage cart transfer nodes 420, and the goods receiving stations 610. More specifically, the aforementioned coordinated movement may apply to the transfer of the mobile storage carts 400 between the aisles 220 of the multilevel warehouse racking system 200, the materials handling vehicle 300, the mobile storage cart transfer node 420, the transporter 500, the goods receiving station 610, or various combinations thereof. In addition, it is contemplated that these instructions may be presented in a variety of forms. For example, and not by way of limitation, these instructions may represent detailed turn-by-turn movements for the transporter 500 and materials handling vehicle 300 to accomplish the aforementioned coordination. Or, the instructions may merely represent a set of position and time coordinates necessary to accomplish the aforementioned coordination. In which case, the transporter 500 and materials handling vehicle 300 would be responsible for developing their own turn-by-turn travel paths to accomplish the aforementioned coordination. In any case, it is contemplated that those practicing the concepts of the present disclosure may rely on conventional or yet-to-be developed teachings related to warehouse traffic management and automated vehicle guidance to achieve the aforementioned coordination.

Figure 14:
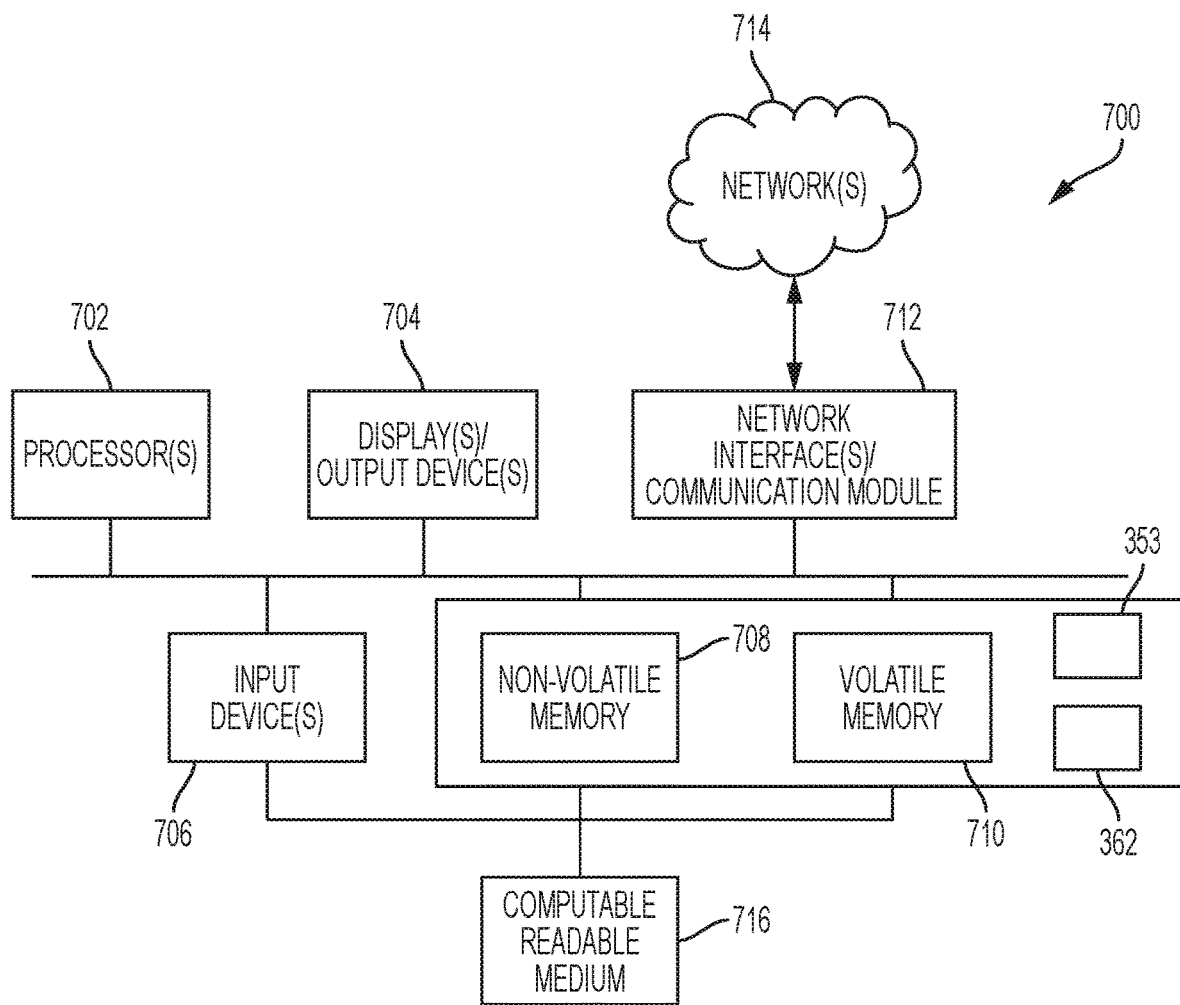
FIG. 14 is a schematic illustration of a computing device according to various embodiments shown and described herein.

Referring to FIG. 14, a block diagram illustrates a computing device 700, through which embodiments of the disclosure can be implemented. The computing device 700 described herein is but one example of a suitable computing device and does not suggest any limitation on the scope of any embodiments presented. For example, the computing device 700 in some embodiments is an example of the remote controller such as the hand-held drive unit described herein and/or other suitable mobile client devices that may be communicatively coupled to the hand-held drive unit. The computing device 700 may be communicatively coupled to one or more computing devices through a warehouse management system. Nothing illustrated or described with respect to the computing device 700 should be interpreted as being required or as creating any type of dependency with respect to any element or plurality of elements. In various embodiments, a computing device 700 may include, but need not be limited to, a desktop, laptop, server, client, tablet, smartphone, or any other type of device that can compress data. In an embodiment, the computing device 700 includes at least one processor 702 and memory (non-volatile memory 708 and/or volatile memory 710). In embodiments, the one or more target TOF depth maps 353 and/or one or more warehouse maps 362 described herein may be stored in the memory. The computing device 700 can include one or more displays (such as the touch screen display of the hand-hand drive unit) and/or output devices 704 such as monitors, speakers, headphones, projectors, wearable-displays, holographic displays, and/or printers, for example. Output devices 704 may be configured to output audio, visual, and/or tactile signals and may further include, for example, audio speakers, devices that emit energy (radio, microwave, infrared, visible light, ultraviolet, x-ray and gamma ray), electronic output devices (Wi-Fi, radar, laser, etc.), audio (of any frequency), etc.

The computing device 700 may further include one or more input devices 706 which can include, by way of example, any type of mouse, keyboard, disk/media drive, memory stick/thumb-drive, memory card, pen, touch-input device, biometric scanner, voice/auditory input device, motion-detector, camera, scale, and the like. Input devices 706 may further include sensors, such as biometric (voice, facial-recognition, iris or other types of eye recognition, hand geometry, fingerprint, DNA, or any other suitable type of biometric data, etc.), video/still images, motion data (accelerometer, GPS, magnetometer, gyroscope, etc.) and audio (including ultrasonic sound waves). Input devices 706 may further include cameras (with or without audio recording), such as digital and/or analog cameras, still cameras, video cameras, thermal imaging cameras, infrared cameras, cameras with a charge-couple display, night-vision cameras, three-dimensional cameras, webcams, audio recorders, and the like. For example, an input device 706 may include the camera 308 described herein.

The computing device 700 typically includes non-volatile memory 708 (ROM, flash memory, etc.), volatile memory 710 (RAM, etc.), or a combination thereof. A network interface hardware 712 can facilitate communications over a network 714 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface hardware 712 can be communicatively coupled to any device capable of transmitting and/or receiving data via the network 714. Accordingly, the network interface hardware 712 can include a communication transceiver for sending and/or receiving any wired or wireless communication. For example, the network interface hardware 712 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 716 may comprise a plurality of computer readable mediums, each of which may be either a computer readable storage medium or a computer readable signal medium. The computer-readable medium 716 may be non-transitory in that it excludes any transitory, propagating signal as a storage medium and may reside, for example, within an input device 706, non-volatile memory 708, volatile memory 710, or any combination thereof. A computer readable storage medium can include tangible media that is able to store instructions associated with, or used by, a device or system. A computer readable storage medium includes, by way of example: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 700 may include one or more network interface hardwares 712 to facilitate communication with one or more remote devices, which may include, for example, client and/or server devices. A network interface hardware 712 may also be described as a communications module, as these terms may be used interchangeably. For clarity, it is noted that usage of the term "in communication with" herein, with respect to the FIG. 14, or elsewhere, may refer to one-way communication or two-way communication.

Figure 15:
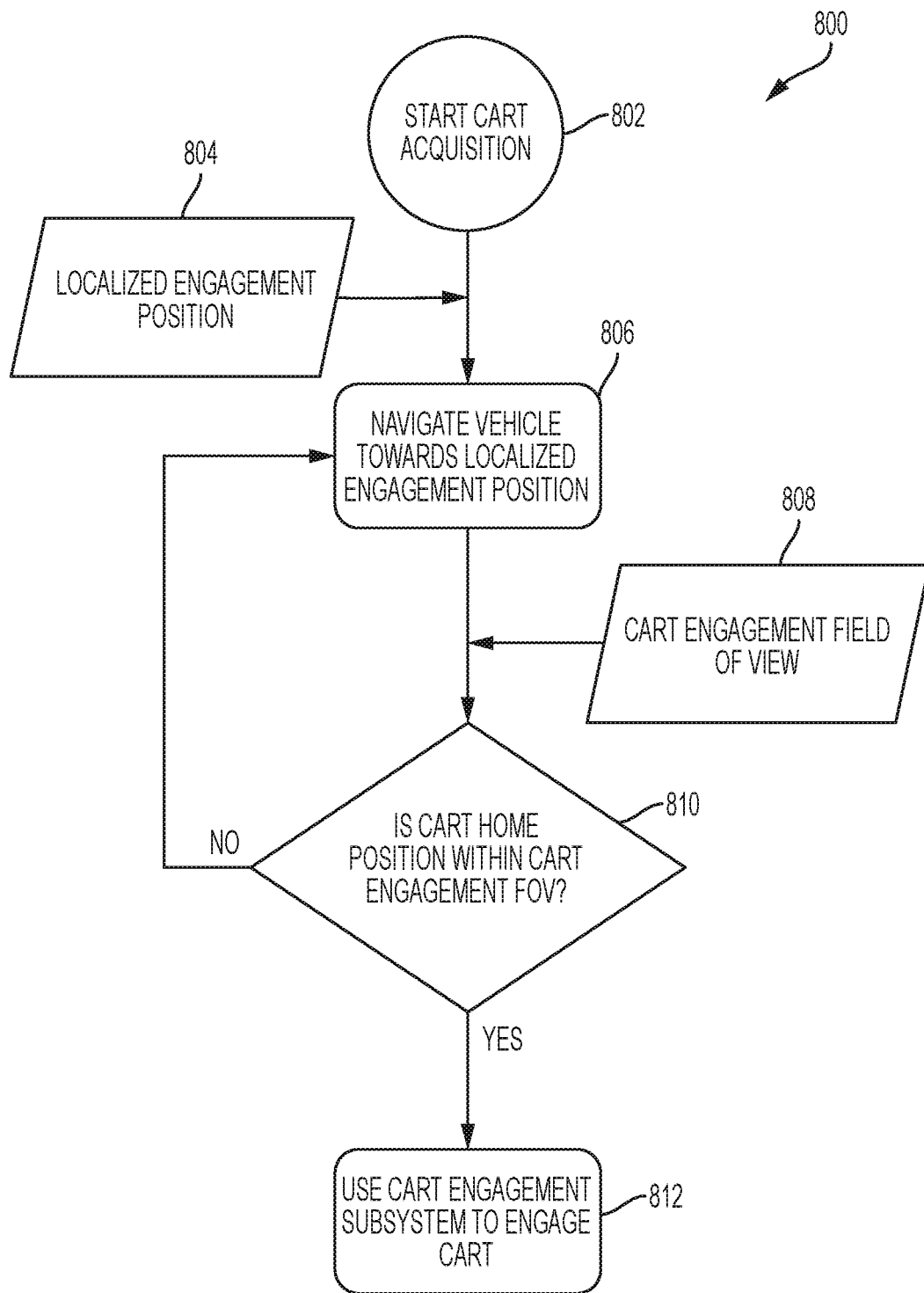
FIG. 15 is a flow chart illustrating cart acquisition methodology according to various embodiments shown and described herein.

A method 800 of operating the goods storage and retrieval system 100 according to one embodiment of the present disclosure is illustrated in FIG. 15 and may be read in light of the goods storage and retrieval system 100 components of FIGS. 1I and 12. As illustrated in FIG. 15, the method 800 includes a step 802 to start cart acquisition followed by a step 804 to receive information regarding a localized engagement position of the cart home position 410. The method 800 further includes in step 806, and through use of the navigation subsystem 360 and the vehicular controller(s), navigating the materials handling vehicle 300 along the inventory transit surface 110 to a localized engagement position and receiving information from the storage cart engagement field of view in step 808. If in step 810 the cart home position 410 is not within the storage cart engagement field of view 352, the method 800 returns to step 806. Otherwise, if in step 810 the cart home position 410 is within the storage cart engagement field of view 352, the method 800 continues on to step 810 and uses the cart engagement subsystem 350 to engage the mobile storage cart 400 by engaging the mobile storage cart 400 in the cart home position 410 with the fork carriage assembly 310.

Figure 16:
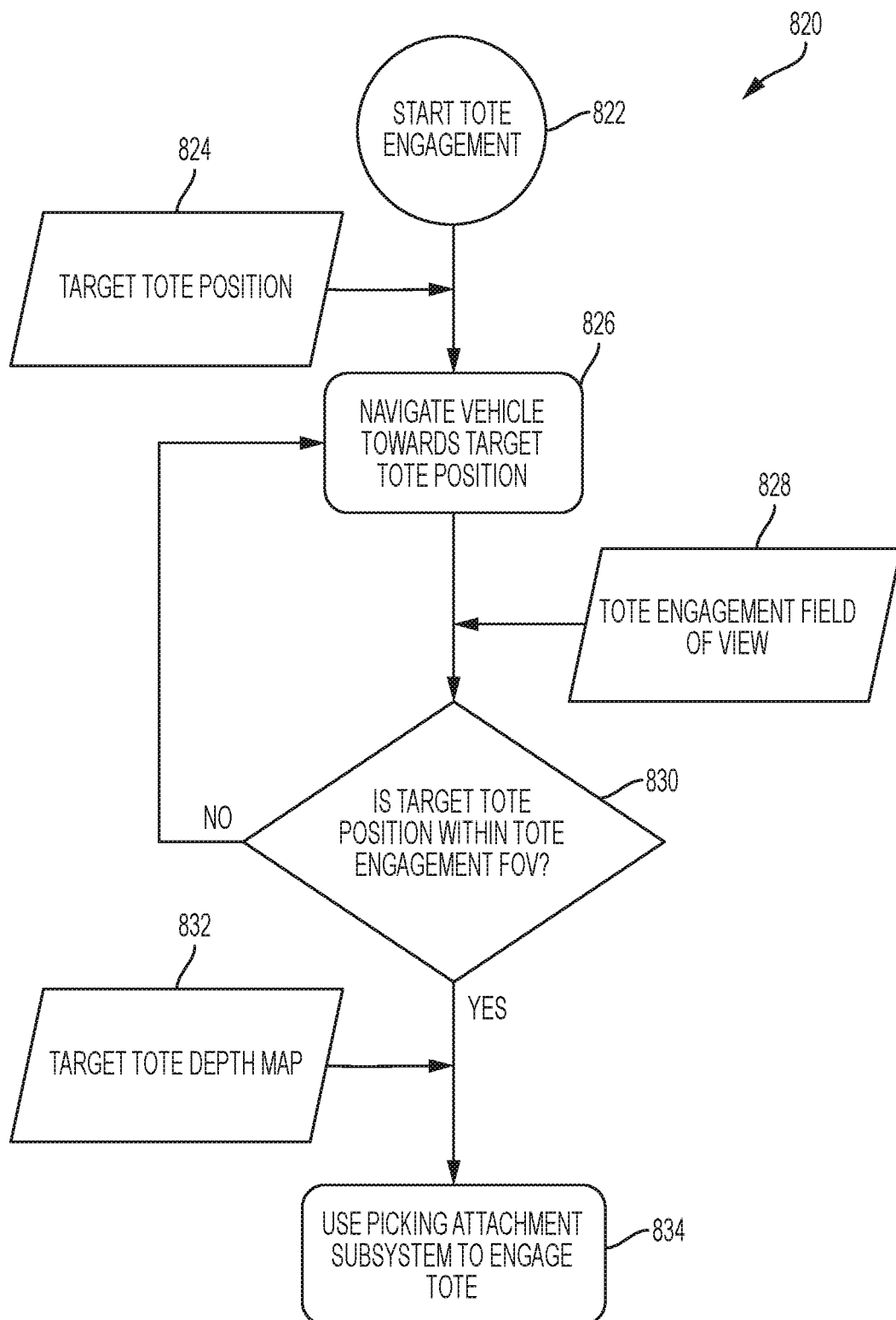
FIG. 16 is a flow chart illustrating tote engagement methodology according to various embodiments shown and described herein.

In embodiments, a method 820 of operating the goods storage and retrieval system 100 may include, as illustrated in FIG. 16, a step 822 to start tote engagement followed by a step 824 to receive information regarding a target tote position of a target tote 214. The method 820 further includes, in step 826, and through use of at least one of the navigation subsystem 360, the picking attachment subsystem 321, and the vehicular controller(s), navigating the materials handling vehicle 300 toward the target tote position and aligning the picking attachment 320 with the target tote 214. In step 828, information is received from the tote engagement field of view 351. If in step 830 the target tote position is not within the tote engagement field of view 351, the method 820 returns to step 826. Otherwise, if in step 830 the target tote position is within the tote engagement field of view 351, the method 820 continues on where the navigation subsystem 360 positions the materials handling vehicle 300 such that the target fiducial 216 is within a field of view of the vision system 354 to visualize the target fiducial 216 for identification purposes, where the vision system 360 may read the target fiducial 216 to identify the target tote 214 and/or verify that the correct target tote 214 is within the field of view of the vision system 354. The method 820 then continues on to step 832 to generate a target tote depth map and, in step 834, to use the picking attachment subsystem 321 to engage the target tote 214 based on the target tote depth map.

With either or a combination of the methods 800 or 820, a velocity number may be assigned to a stock keeping unit (SKU) associated with a target tote 214 in the multi-level warehouse racking system 200 based on an order velocity indicative of a frequency of usage parameter associated with the target tote 214. A relatively high velocity number may be associated with a low storage position on a low shelf of the multilevel warehouse racking system 200, and a relatively low velocity number may be associated with a high storage position on a high shelf of the multilevel warehouse racking system 200. For example, a lowest velocity number may be associated with a highest shelf, and a highest velocity number may be associated with a lowest shelf.

Further, the picking attachment 320 and the fork carriage assembly 310 may be used to move the target tote 214 from a portion of the multilevel warehouse racking system 200 associated with a relatively low velocity number to a portion of the multilevel warehouse racking system 200 associated with a relatively high velocity number based on an increase in the order velocity with respect to the target tote 214. Further, the picking attachment 320 and the fork carriage assembly 310 may be used to move the target tote 214 from a portion of the multi-level warehouse racking system 200 associated with a relatively high velocity number to a portion of the multilevel warehouse racking system 200 associated with a relatively low velocity number based on a decrease in the order velocity with respect to the target tote 214.

In embodiments, a first target tote may be engaged at a first storage position on a high shelf associated with a relatively low velocity number with the picking attachment 320. The first target tote may be placed with the picking attachment 320 in the mobile storage cart 400 engaged by the fork carriage assembly 310. Further, the materials handling vehicle 300 may be navigated to a second target tote when the second target tote is assigned a relatively high velocity number and is within a close distance to the first storage position. The second target tote may be engaged with the picking attachment 320, which may lower the second target tote to a low shelf associated with the relatively high velocity number or place the second target tote in the mobile storage cart 400. For example, the materials handling vehicle 300 may be navigated to a subsequent pick location when the second target tote is placed in the mobile storage cart 400, and the second target tote may be placed on the low shelf associated with the relatively high velocity number while at the subsequent pick location.

In other embodiments, a first target tote may be engaged at a storage first position on a low shelf associated with the high velocity number with the picking attachment 320, and the picking attachment 320 may place the first target tote in the mobile storage cart 400 engaged by the fork carriage assembly 310. Further, the materials handling vehicle 300 may be navigated to a second target tote when the second target tote is assigned a relatively low velocity number and is within a close distance to the first position on the low shelf to engage the second target tote with the picking attachment 320 and either raise the second target tote to a high shelf associated with the relatively low velocity number or place the second target tote in the mobile storage cart 400. For example, the materials handling vehicle 300 may be navigated to a subsequent pick location when the second target tote is placed in the mobile storage cart 400, and the picking attachment 320 places the second target tote on the high shelf associated with the relatively low velocity number while at the subsequent pick location.

In embodiments, positioning the materials handling vehicle 300 may be positioned in a first aisle of the multilevel warehouse racking system 200, and one or more target totes 214 may be placed with the picking attachment 320 in the mobile storage cart 400 engaged by the fork carriage assembly 310. Further, the mobile storage cart 400 may be used as a temporary storage location to level inventory when one or more inventory orders are received such that the one or more target totes 214 are shuffled between the mobile storage cart 400 and a plurality of shelves 240 of the multilevel warehouse racking system 200 based on a respective order velocity indicative of a frequency of usage parameter associated with each target tote 214 to optimize a usage parameter with respect to the first aisle. Advantages from such inventory leveling may include fewer trips by the materials handling vehicle 300 back and forth through an aisle 220 and more picks and puts per distance traveled by the picking attachment 320 of the materials handling vehicle 300 to lower a cost per pick. It is contemplated that such an inventory leveling system may work in conjunction with a warehouse management system to control product flow and optimize pick and replenishment and to organize products based on an average or known velocity based on product demand.

With such an inventory leveling system, a relatively low velocity number associated with a high shelf of the multilevel warehouse racking system 200 may be assigned to a SKU associated with a first target tote that is stored in the mobile storage cart 400, and a relatively high velocity number associated with a low shelf of the multilevel warehouse racking system 200 may be assigned to a SKU associated with a second target tote stored on a high shelf of the multilevel warehouse racking system 200. Information may be received indicative of the second target tote being stored on the high shelf. The materials handling vehicle 300 may be navigated to a location of the multilevel warehouse racking system 200 associated with the high shelf during an off-peak picking time or an off shift time, and the mobile storage cart 400 engaged by the fork carriage assembly 310 may be moved to the high shelf. Once in position, the picking attachment 320 may exchange the first target tote stored in the mobile storage cart 400 with the second target tote stored on the high shelf to store the second target tote in the mobile storage cart 400. Such an exchange is to level inventory and reduce the amount of fork carriage assembly 310 raising and lowering needed to retrieve target totes 214. This would be particularly significant during, for example, peak periods or high volume shifts because it would reduce the time needed to fulfill an inventory order and the energy expended by the materials handling vehicle 300.

In embodiments, one or more target totes 214 may be placed with the picking attachment 320 in the mobile storage cart 400 engaged by the fork carriage assembly 310 such that the mobile storage cart 400 is utilized as a temporary storage location. The picking attachment 320 pick and place operations may be interleaved by picking up and placing away multiple target totes 214 during a single trip of the materials handling vehicle 300 down an aisle 220 of the multilevel warehouse racking system 200.

The first aisle may comprise a very narrow aisle (VNA). Further, use of the mobile storage cart 400 as a temporary storage location allows for multiple picks to be made in the aisle 220 or while the fork carriage assembly 310 is raised to a high storage location to minimize energy used to raise and lower the fork carriage assembly 310. The mobile storage cart 400 may also be used to fill multiple inventory order in a batch and deliver the entire batch to a location or to a transfer node 420 for delivery to another location.

A first target tote 213 may be stored on a shelf of a plurality of shelves 240 in the first aisle of the multilevel warehouse racking system 200, and a second target tote 213 may be stored in the mobile storage cart 400. The first target tote 213 on the shelf in a shelf location may be engaged by the picking attachment 320 to pick up the first target tote 213 with the picking attachment 320, which may remove the first target tote 213 from the shelf location and place the first target tote 213 on a container bay 430 of the mobile storage cart 400. The picking attachment 320 may engage the second target tote 213 stored in the mobile storage cart 400, remove the second target tote 213 from the mobile storage cart 400, and place the second target tote 213 in the shelf location to place away the second target tote 213.

In another embodiment, it is contemplated that the materials handling vehicle 300 may transfer mobile storage carts 400 to the transporter 500. In this embodiment, the location of the storage cart transfer node 420 would correspond to the location of the transporter 500.

A transporter 500 may travel outside of an aisle 220, such as along the floor beneath a row of mobile storage carts 400, which can help keep the aisle 220 clear as well as reduce the travel time of the transporter 500 and/or materials handling vehicle 300.

The materials handling vehicle 300 lowers the mobile storage cart 400 onto the mobile storage cart transfer node 420. The transporter 500 gets closer to the materials handling vehicle 300 and rotates toward the mobile storage cart transfer node 420.

The transporter 500 arrives at the mobile storage cart transfer node 420 under the mobile storage cart 400 and carries the mobile storage cart 400 away in a suitable direction. Examples of transporters 500 are shown and described in more detail, for example, in U.S. Patent Application Publication US 2008/0166217 A1.

A warehouse management computing hub and the materials handling vehicle 300 may be collectively configured to execute a place operation comprising selection of a mobile storage cart transfer node 420 that is accessible by a transporter 500 and the materials handling vehicle 300, and retrieval of a target mobile storage cart 400 from the mobile storage cart transfer node 420 by engaging the target mobile storage cart 400 with a lifting mechanism of the materials handling vehicle 300.

A materials handling vehicle 300 arrives at a mobile storage cart transfer node 420. Multiple transporters 500, each carrying a mobile storage cart 400, approach the materials handling vehicle 300, with the first transporter 500 assigned to the mobile storage cart transfer node 420.

The first transporter 500 carries the mobile storage cart 400 to the assigned mobile storage cart transfer node 420 in front of the materials handling vehicle 300.

The materials handling vehicle 300 moves down the aisle 220 away from the mobile storage cart transfer node 420. The first transporter 500 travels under the first level of the lower level of rack bays 218 of the multilevel warehouse racking system 200 in a suitable direction. More transporters 500, each carrying a mobile storage cart 400, move in the aisle 220 in a suitable direction. In some embodiments, transporters 500 follow the materials handling vehicle 300 like a train moving down the aisle 220.

Referring again to FIG. 1I, this application further includes methods of operating a goods storage and retrieval system 100. The method includes providing the goods storage and retrieval system 100 and navigating the materials handling vehicle 300 along the inventory transit surface 110 to the target tote through the use of the navigation subsystem 360 and the one or more vehicular controllers independent of movement of the transporter 500 within the goods storage and retrieval system 100. The method includes engaging or disengaging the target tote with the picking attachment secured to the fork carriage assembly 310 through use of the X-Y-Z-Ψ positioner at the tote transfer zone 219 and at multiple levels of the multilevel warehouse racking system 200 independent of movement of the transporter 500 within the goods storage and retrieval system 100.

Referring to FIGS. 1I, 1E, and 1F, the method further includes placing, with the picking attachment, the target tote on the tote transfer zone 219 or on a level of the multi-level warehouse racking system 200 and engaging the target tote 214 with the transporter 500 through use of the transporter-based engagement hardware 540 comprising a transporter lifting surface 520. Engaging the target tote 214 with the transporter 500 may further include lifting the target tote 214 relative to a tote supporting surface 219A of the tote transfer zone 219 with the transporter lifting surface 520.

Referring again to FIG. 1I, in some embodiments, the method further includes transmitting, via the warehouse management computing hub, instructions to the materials handling vehicle 300 and the transporter 500. The method may further comprise transporting the target tote with the transporter 500 to a goods receiving station 610 comprising a goods selection terminal 620 and removing the target tote from the transporter lifting surface. Removing the target tote may include elevating a transporter raising surface from an access height flush with the inventory transit surface to a selection height.

The method may further include providing a mobile storage cart 400 and engaging the mobile storage cart 400 with the fork carriage assembly 310 through the use of a cart engagement subsystem of the materials handling vehicle 300. The method then includes placing, with the picking attachment, the target tote in the mobile storage cart 400 engaged by the fork carriage assembly 310. In some embodiments, the method then further includes disengaging the mobile storage cart 400 with the fork carriage assembly 310 through the use of a cart engagement system of the materials handling vehicle 300 and engaging the mobile storage cart 400 with the transporter lifting surface. The method then includes transporting the mobile storage cart 400 with the transporter 500 to a goods receiving station 610 comprising a goods selection terminal 620 and removing the target tote from the mobile storage cart 400.

Figure 11:
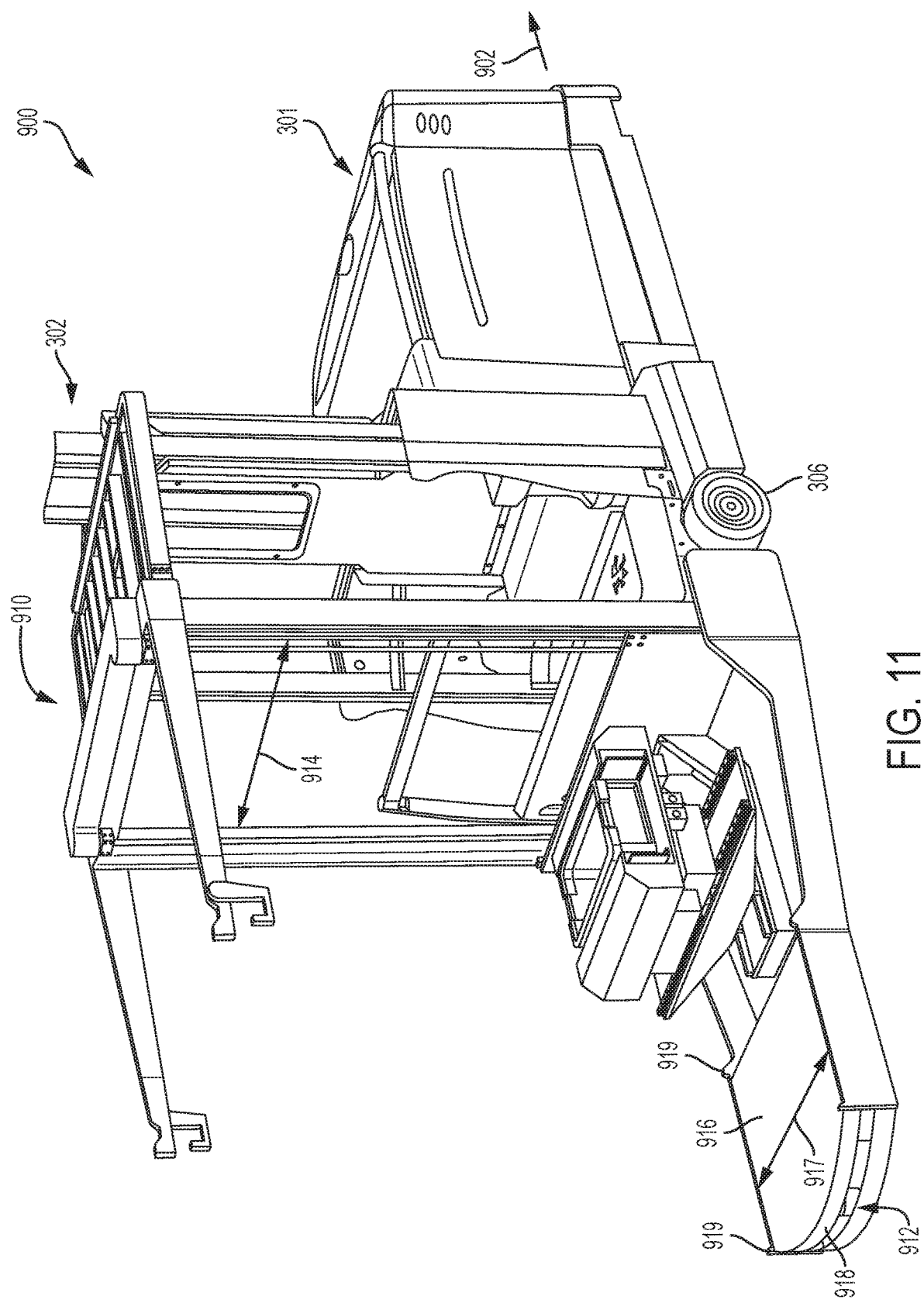
FIG. 11 illustrates a materials handling vehicle with a monofork carriage assembly according to various embodiments shown and described herein.

Referring to FIGS. 11-12, this application is further directed to a materials handling vehicle 900 comprising a vehicle body 301, a plurality of wheels 306 supporting the vehicle body 301 and defining a direction of travel 902 for the vehicle body 301, a braking system 371, a traction control unit 372, and a steering assembly 373, each operatively coupled to one or more of the plurality of wheels 306, a mast assembly 302, a monofork carriage assembly 910 coupled to the mast assembly 302 for movement along a lifting dimension of the mast assembly 302, and a transport, engagement, or disengagement accessory configured to facilitate transport, engagement, or disengagement of materials by the materials handling vehicle 900. The transport, engagement, or disengagement accessories may be any of the accessories previously described, such as, but not limited to, a picking attachment 320, a picking attachment subsystem 321, cart engagement subsystem 350, a navigation subsystem 360, a scanning laser, a vision system, a 3D Time of Flight (TOF) system, an obstacle-detecting sensor, or other automated storage and retrieval system hardware. Lastly, the monofork carriage assembly comprises a hollow body portion 912 accommodating at least a portion of the transport, engagement, or disengagement accessory therein. In embodiments, the hollow body portion 912 may include the cart engagement sensors 355, as shown in FIG. 5B.

The monofork carriage assembly 910 defines an operator compartment width 914 that is oriented across the direction of travel 902 of the vehicle body, and the operator compartment width 914 may be between about 100 cm and about 125 cm. A "monofork" carriage assembly 910 can be distinguished from conventional materials handling vehicle lifting forks because the monofork carriage assembly 910 comprises a unitary materials handling platform 916 that is oriented across the direction of travel 902 of the vehicle body 301 and defines a platform width 917 parallel to the operator compartment width 914. The platform width 917 may be at least about 75 cm and is less than the operator compartment width 914. The unitary materials handling platform 916 may comprise a leading face 918 that is oriented across the direction of travel 902 of the vehicle body 301. The leading face 918 of the platform 916 forms a protruding arc that extends across the platform width 917 and protrudes along the direction of travel 902 of the vehicle body 301. Furthermore, the unitary materials handling platform 916 may comprise at least two opposing pairs of vertically oriented cart stabilizers 919. The two opposing pairs of cart stabilizers 919 are located on opposite sides of the unitary materials handling platform 916 along the direction of travel 902 of the vehicle body 301, and each cart stabilizer 919 comprises an inclined contact edge facing an opposing inclined contact edge of a cart stabilizer 919 on an opposite side of the unitary materials handling platform 916. In this manner, the aforementioned cart stabilizers 919 will operate to automatically align a mobile storage cart or similar object that is slightly askew with respect to the materials handling platform 916, as the materials handling platform 916 and the contact edges of the cart stabilizers 919 are lifted into contact with the mobile storage cart.

The monofork carriage assembly 910 may be removably coupled to the mast assembly 302. In addition, the unitary materials handling platform 916 may engage the mobile storage cart through the use of mechanical latches, such as, but not limited to, dowels and corresponding holes. Specifically, the unitary materials handling platform 916 may comprise dowels that deviate from the parallel plane flush with the unitary materials handling platform 916, and the mobile storage cart may comprise holes corresponding to the placement of dowels on the unitary materials handling platform 916. These corresponding holes on the mobile storage cart are configured to receive the dowels on the unitary materials handling platform 916, thereby securing the mobile storage cart in place on the unitary materials handling platform 916.

For the purposes of describing and defining the present invention it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A goods storage and retrieval system, comprising a multilevel warehouse racking system, a materials handling vehicle comprising cart engagement hardware, a mobile storage cart, and a transporter, wherein:
   the cart engagement hardware engages and disengage the mobile storage cart at a variety of locations along an inventory transit surface of the goods storage and retrieval system independent of movement of the transporter within the goods storage and retrieval system;
   the cart engagement hardware comprises a mobile storage cart support platform defined by one or more vertically-oriented cart lifting forks; and
   the mobile storage cart comprises at least two vertically-oriented fork slots structurally configured to receive the vertically-oriented cart lifting forks and a transporter access opening that is sized and configured to permit the transporter to enter and exit through the transporter access opening along the inventory transit surface, the at least two vertically-oriented fork slots provided on opposite sides of the transporter access opening.

2. The goods storage and retrieval system of claim 1, wherein the cart engagement hardware comprises a mobile storage cart support platform defined by one or more vertically-oriented cart lifting forks.

3. The goods storage and retrieval system of claim 1, wherein the cart engagement hardware comprises anti-rock cart engagement hardware configured to engage a top end of the mobile storage cart.

4. The goods storage and retrieval system of claim 3, wherein the anti-rock cart engagement hardware comprises a pair of support arms configured to engage the top end of the mobile storage cart.

5. The goods storage and retrieval system of claim 4, wherein the anti-rock cart engagement hardware comprises lateral anti-rock hardware wherein each support arm comprises a hook subtending extension, and the mobile storage cart comprises a pair of extension passages structurally configured to permit the hook subtending extensions to pass at least partially through the pair of extension passages.

6. The goods storage and retrieval system of claim 4, wherein the anti-rock cart engagement hardware comprises front-rear anti-rock hardware wherein each support arm comprises an anti-rock hook defining a notch, the anti-rock hook extends downwardly at a distal portion of the support arm to define an engagement gap between a hook subtending extension and a terminal portion of the anti-rock hook, and the mobile storage cart comprises hook engaging features structurally configured to engage the anti-rock hooks of the pair of support arms.

7. The goods storage and retrieval system of claim 4, wherein:
   each support arm comprises an anti-rock hook defining a notch, and a hook subtending extension; and
   the anti-rock hook extends downwardly at a distal portion of the support arm to define an engagement gap between the hook subtending extension and a terminal portion of the anti-rock hook.

8. The goods storage and retrieval system of claim 7, wherein the mobile storage cart comprises:
   hook engaging features structurally configured to engage the anti-rock hooks of the pair of support arms; and
   a pair of extension passages structurally configured to permit the hook subtending extensions to pass at least partially through the pair of extension passages to permit the anti-rock hooks of the pair of support arms to engage the hook engaging features of the mobile storage cart while the pair of support arms engage a top end of the mobile storage cart.

9. The goods storage and retrieval system of claim 1, wherein:
the mobile storage cart comprises at least two vertically-oriented fork slots;
the cart engagement hardware comprises a mobile storage cart support platform defined by one or more vertically-oriented cart lifting forks; and
the vertically-oriented fork slots are structurally configured to receive the vertically-oriented cart lifting forks.

10. The goods storage and retrieval system of claim 1, wherein:
the transporter comprises a transporter lifting surface and is structurally configured to lift the mobile storage cart off of the inventory transit surface upon which the multi-level warehouse racking system is supported by elevating the transporter lifting surface from a traveling height to a transporting height; and
the mobile storage cart is structurally configured to permit the transporter to enter and exit a lifting zone beneath the mobile storage cart in at least two orthogonal directions, with the lifting surface of the transporter at the traveling height.

11. The goods storage and retrieval system of claim 1, wherein:
the materials handling vehicle further comprises a navigation subsystem comprising a vision system;
the multilevel warehouse racking system comprises a target fiducial associated with a target tote to guide engagement of the target tote; and
the navigation subsystem is configured to position the materials handling vehicle such that the target fiducial is within a field of view of the vision system.

12. The goods storage and retrieval system of claim 11, wherein the navigation subsystem is configured to utilize the target fiducial of the multilevel warehouse racking system to position the materials handling vehicle such that the target tote is within a tote engagement field of view of a picking attachment subsystem.

13. The goods storage and retrieval system of claim 11 wherein:
the multilevel warehouse racking system comprises a plurality of target fiducials associated with the target tote; and
one of the target fiducials is positioned on a shelf unit of a rack module of the multi-level warehouse racking system; and
another of the target fiducials is positioned on the target tote.

14. The goods storage and retrieval system of claim 1, further comprising a goods receiving station comprising a goods selection terminal outfitted for removal of totes from the mobile storage cart.

15. The goods storage and retrieval system of claim 1, further comprising a goods receiving station, a goods selection terminal, and an intermediate transfer station, wherein:
the goods selection terminal is outfitted for removal of totes from the mobile storage cart; and
the intermediate transfer station is positioned along a mobile storage cart travel path extending from a mobile storage cart transfer node to the goods receiving station.

16. The goods storage and retrieval system of claim 1, further comprising a warehouse management computing hub in communication with the transporter and the materials handling vehicle and programmed to instruct the transporter and the materials handling vehicle to coordinate engagement, transport, and disengagement of the mobile storage cart in the goods storage and retrieval system.

17. The goods storage and retrieval system of claim 1, further comprising a plurality of RFID tags embedded in the inventory transit surface at vehicle stop locations, tote transfer zones, transfer nodes, pick-place locations, or combinations thereof.

18. The goods storage and retrieval system of claim 1, further comprising a target fiducial associated with a target tote, where the target fiducial is disposed on a rack module of the multilevel warehouse racking system, the target tote, or both, to guide engagement of the target tote.

* * * * *